United States Patent [19]

Hawkins

[11] Patent Number: 4,675,830

[45] Date of Patent: Jun. 23, 1987

[54] METHOD FOR PRODUCING A SCALEABLE TYPEFACE DATA

[75] Inventor: Thomas B. Hawkins, Groton, Mass.

[73] Assignee: Compugraphic Corporation, Wilmington, Mass.

[21] Appl. No.: 628,192

[22] Filed: Jul. 6, 1984

[51] Int. Cl.[4] .................. G06F 3/153; G06F 15/20
[52] U.S. Cl. .................. 364/518; 340/731; 364/523
[58] Field of Search .............. 364/518, 520, 521, 710, 364/200 MS File, 523; 340/721, 722, 734, 753, 754, 739

[56] References Cited

U.S. PATENT DOCUMENTS

| | | | |
|---|---|---|---|
| 4,029,947 | 6/1977 | Evans et al. | 364/523 X |
| 4,153,896 | 5/1979 | White | 364/521 X |
| 4,156,915 | 5/1979 | Hasenbalg et al. | 364/521 |
| 4,298,945 | 11/1981 | Kyte et al. | 364/523 |
| 4,338,673 | 7/1982 | Brown | 340/731 X |

Primary Examiner—Errol A. Krass
Assistant Examiner—H. R. Herndon
Attorney, Agent, or Firm—Richard J. Birch

[57] ABSTRACT

A method for producing scaleable contour data that is capable of providing: (1) bit-map font data at any resolution and at any point size and, (2) grid aligned contours for output to contour driven devices such as, pen plotters and numerically controlled machines, is disclosed. The method "stretches" and "compresses" character contours to bring specified contour points ("Skeletal Points") into proper alignment with the "bit-map grid". The mathematical basis for the method is one of (1) breaking the character contour into segments (between a pair of Skeletal Points), (2) offsetting all coordinates in the segment to bring the first Skeletal Point to align with the grid, and finally, (3) linear scaling of the segment with a scale factor which brings the second Skeletal Point to align with the grid.

17 Claims, 9 Drawing Figures

METHOD FOR PRODUCING A SCALEABLE TYPEFACE DATA

BACKGROUND OF THE INVENTION

The present invention relates to graphic image processing techniques and, more particularly, to a method for producing truly scaleable typeface data that is capable of providing bit-map font data at any resolution and at any point size.

The problem of representing graphic images on digitally controlled machines is classic. Graphic images are conceived and usually executed in an "analogue" fashion with continuous smooth flowing lines, infinite angles and subtle variations in their internal dimensions.

The study of a graphic image as simple as a dot drawn in ink on a piece of paper would reveal infinite angles measured along the contour which encircles the dot through 360 degrees. Likewise, an infinite number of measurements could be taken across the dot at an infinite number of locations.

However, the representation of such a graphic image in "digital" form places major restrictions on its appearance. First the infinite and subtle variation of dimensions must be represented by a discrete set of dimensions as measured between a finite set of locations on a two dimensional coordinate plane. Additionally, in many digital systems, there exists only two discrete angles: vertical and horizontal.

Under these restrictions, one can only produce an "illusion" of the dot, but its size, smoothness and position will be compromised. The success of the illusion (or the degree to which the image is compromised) is directly dependent on two factors.

First, the resolution of the digital system determines the number of addressable locations, and consequently the number of representable dimensions available to aid in the illusion—the higher the resolutions, the better the quality of the illusion.

Secondly, the selection of appropriate key angle, lines, and dimensions used to represent the image contributes significantly to the success of the illusion. In the example of the dot, key points to be established in order to create an illusion of the dot would be its height and width. However, that in itself makes no distinction between a square dot and a round dot. The round dot illusion, therefore, could be promoted by notching the corners of the square. In this way, an illusion of angles other than vertical and horizontal is created.

An additional complication arises when digitally defined images are to be scaled. Essentially, this involves translating the image from one digital system to another (i.e., from one "illusion" to another).

These digital images can exist as either contours defining the bounds of the images or as dots or strokes filling the interiors of the images. In either case, the fundamental problems are the same. Neither representation can define the graphic image without some loss of detail. Scaling the image can contribute to further loss of detail. Conversion from contours to strokes and vice versa likewise destroys detail.

Because the basic interest is in producing solid filled images, the following comments are confined to those regarding the generation of dots or strokes filling the interior of graphic images. Essentially, there are two methods to produce solid filled graphic images at multiple sizes.

The first method is to utilize a digital representation composed of strokes or data, which has been carefully created to form the optimum illusion of the image. Scaling is then accomplished by replicating stroke or dot patterns for increased scale and by throwing away strokes and dots for reduced scale. The problem arises in determining which dots or strokes are key to the creation of an optimal illusion at the desired scale size. Because important information regarding the original "analogue" graphic image is missing, this method cannot produce optimal quality images.

The second method is to define the digital image as a contour initially. This contour can then be scaled and mathematically "filled" with strokes or dots. If the original contour is described in sufficient detail, the resulting illusion can be good. However, because the contour is only a description of a hollow shell, and the strokes or dots represent a digital system, once again the size, position, smoothness, and internal dimensions of the image are compromised. The unavoidable mathematical errors caused by interpreting "analogue" images as digital produce unpredictable results.

The output of characters (letterforms) as graphic images on an output graphic device requires the scaling of digital images. If the contour of the character is described in a sufficiently high resolution, one can consider the digital image as "analogue", that is to say, it has lost no substantial detail. To scale this digital representation for the creation of strokes or dots for lower resolution output requires some special consideration in order to create optimal character illusions. The following is the basic description of a system designed to scale typefaces over a variety of sizes and output resolutions while still maintaining optimal character design.

BRIEF DESCRIPTION OF THE INVENTION

The present invention is a truly scaleable typeface data process capable of providing bit-map font data at any resolution and at any point size. The invention reduces the aesthetic problems encountered when contour descriptions of characters are mathematically scaled to low resolution/point sizes via standard linear techniques. Under the invention, improved scalability is achieved by committing to the character database: (1) key points on the character contour, which are designated SKELETAL POINTS, and specifically assigned character DIMENSIONS between these SKELETAL POINTS. This additional data provides scaling algorithms with the necessary control over dimensional relationships as the character is scaled and translated to a bit-map.

The present invention utilizes a method in which character contours are "stretched" and "compressed" to bring specified contour points (the SKELETAL POINTS) into proper alignment with the "bit-map grid". The mathematical basis for the concept is, therefore, one of (1) breaking the character contour into segments (between a pair of SKELETAL POINTS), (2) offsetting all coordinates in the segment to bring the first SKELETAL POINT to align with the grid, and finally, (3) linear scaling of the segment with a scale factor which brings the second SKELETAL POINT to align with the grid.

Aesthetic problems one encounters when scaling characters over low resolution devices arise from the fact that (1) Roman characters are comprised of strokes, (2) that the strokes are generally horizontal and vertical to maintain an even rhythm or texture across the page, and (3) that the general orientation of lines of characters is parallel or perpendicular to the direction at which dots are output on the page by the output device. The problem can be thought of as similar to that encountered when halftone images are rescreened. If the rescreening angle matches the original screen angle, a disturbing moire pattern can develop. To reduce the effect of the moire, the rescreen angle is altered. This explains why stem weights on an italic typeface and other diagonal letterforms exhibit less variation and why, theoretically, there should be less need to control such stem weights at angles other than portrait, landscape, inverse portrait, and inverse landscape.

It is accordingly a general object of the invention to provide scaleable contour data.

It is a specific object of the invention to provide truly scaleable typeface data that is capable of producing bit-map font data at any resolution and at any point size.

It is another object of the invention to provide a character database which includes key points on the character contour and the character dimensions between these key points.

It is a feature of the invention that the character database defines within each character form a sub-structure of related character points and lines and their aesthetic relationship so that character integrity can be maintained as the form is altered for bit-map creation.

It is another feature of the invention that the control of specific character dimensions is prioritized by ordering the processing of related character points and lines in a three-like structure.

It is another feature of the invention that the character form substructure points and lines are aligned to a grid while specific non-grid alignment is utilized in order to control the angles of diagonal character strokes.

It is still another feature of the invention that dimension controls are automatically disabled when the output bit-map resolution is high enough to display accurately any variation of such dimensions which may have been designed into the character form.

It is a further feature of the invention that character contours are segmented by specific Y-classes or zones so that all character points and lines falling within an assigned zone are thereby treated consistently.

It is a still further feature of the invention that conflicts produced by convergence of the separate roots and branches of the tree-like data structure on the same character point are avoided by inserting an additional point on the character coordinate list so that the additional point becomes associated with one branch or root, while the original remains associated with the other.

It is an additional feature of the invention that absolute definition is provided for those segments along the character contours which are to be scaled ("stretched" or "compressed") to allow character points and lines to be moved against the output grid.

These objects and other objects and features of the invention will best be understood from a detailed description of a preferred embodiment thereof selected for purposes of illustration and shown in the accompanying drawings.

DESCRIPTION OF THE DRAWINGS

FIG. 9 is designed for use as an overlay to the FIG. 8 character.

DETAILED DESCRIPTION OF THE INVENTION

Figure 1:
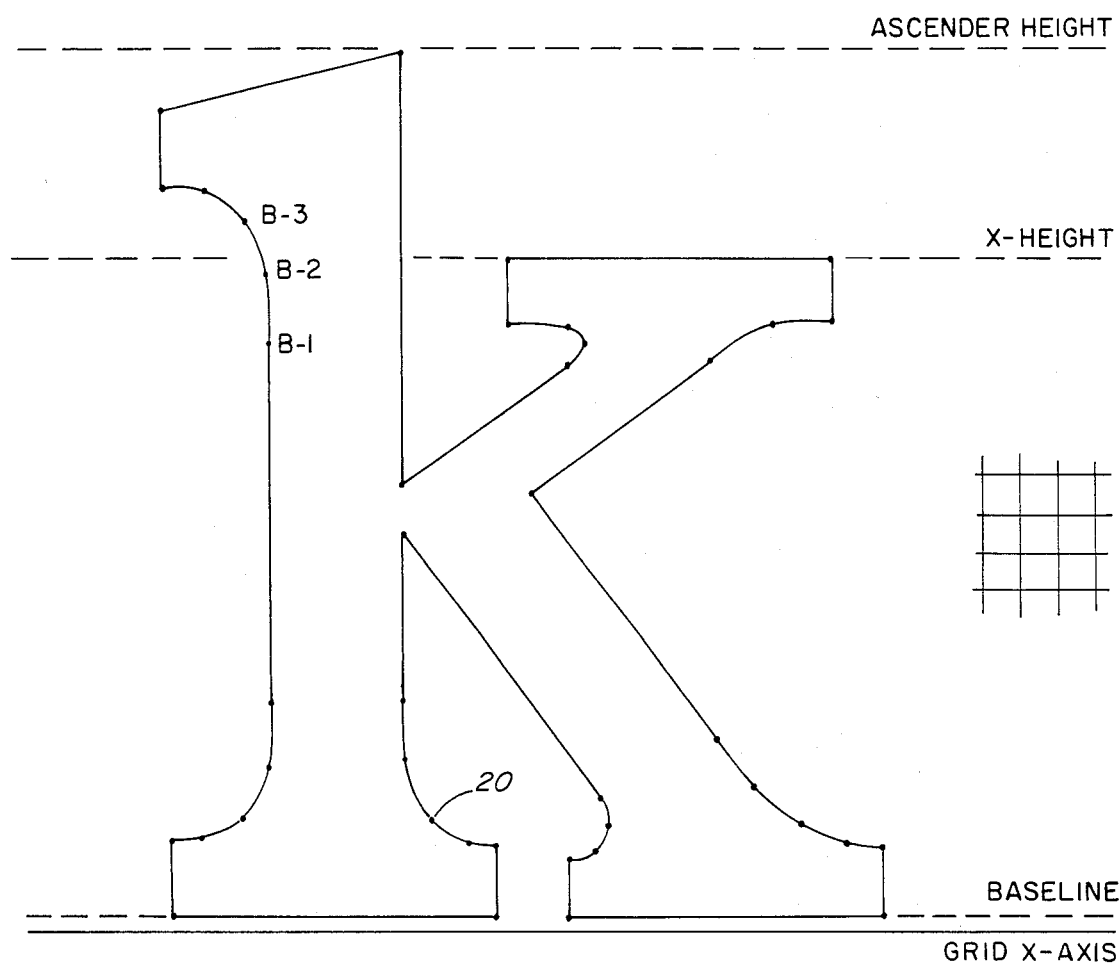
FIG. 1 is an illustration of an original character that is defined by a set of X/Y pairs listed in order around the character contour.

The process of the invention will best be understood by first describing the theory and terminology of the process. Thereafter, the process will be described in connection with a specific application of the process as shown in the sequential series of drawings illustrating the modification of a letter "K". Finally, the FORTRAN source code for implementing the process will be set forth.

PROCESS THEORY AND TERMINOLOGY

1.0 Process Controls

The process of the invention improves scale results by isolating specific scaling problems and providing the following controls.

1.1 Grid Alignment

Translation of smooth character contours to discrete pixels often results in flattened contours or "widowed" pixels. Under the present invention, this translation is done in a way, such that adjacent stroke "runs" are of optimum length to create the best possible contour representation. This is accomplished by either specifically aligning or specifically non-aligning points along the contour with the established grid. The term grid, as used herein, refers to the series of horizontal and vertical lines which intersect at the center of all addressable dots on the output device. Of course, this grid varies in density based on the resolution of the output device and the point size to which the character contour is to be scaled. Generally, most extreme x-values and extreme y-values must align appropriately with the grid, while major diagonal strokes should not.

1.2 Character Internal Order Relative to Baseline, Height, Etc.

Because of slight "inconsistencies" which are intentionally designed into character contours to produce optical consistency, character heights, baselines, etc., often round-off uncontrollably to create misaligned characters. Therefore, a provision must be made to establish control over certain key horizontal lines in a typeface. This must be accomplished such that internal character forms maintain correct internal proportion.

To this end, specific segments along character contours are linked to defined "bands" (Y-CLASSES) which run horizontally from character to character through a line of text. A typical band is defined by the baseline and the x-height y-values. All internal forms falling within that band are scaled vertically to bring the y-value representing the baseline to sit at the defined baseline pixel and the x-height y-value to meet the X-height pixel.

1.3 X/Y Dimensions

Certain dimensions in a design should remain consistent relative to one another) as scaling takes place. However, due to round-off errors, such dimensional relationships are often lost. Therefore, a method for controlling dimensions during scaling is provided.

Dimensions are generally established by the linking of pairs of ASSOCIATED SKELETAL POINTS and "measuring" the number of output device pixels between them. In this manner, the dimension is allowed to round up or down as necessary (i.e. to be represented by the optimum number of pixels). However, certain key character dimensions must be controlled additionally to ensure visual consistency with other key character forms such as character stems, widths, serifs, etc. This consistency can be within a character or from one character to another. It is accomplished by linking pairs of ASSOCIATED SKELETAL POINTS and additionally specifying a CONTROL-DIMENSION by which they are linked. For example, a SKELETAL point defining the left side of a character stem is linked to the ASSOCIATED SKELETAL point on the right side of the stem, and then the distance between these two SKELETAL points at scale time is defined by the CONTROL-DIMENSION established for all stems in the typeface.

Because subtle inconsistencies are often designed into characters to make them optically "correct" when output on high resolution devices, a method is provided by which CONTROL-DIMENSIONS are "shut off" when resolution is adequate to accurately display dimension variations. This technique is referred to as the "1¼ PIXEL SHUT OFF".

1.4 Definition of Control-Dimensions at Scale-Time

CONTROL-DIMENSIONS are established by converting measurements made over the character contour description to the numbers of output pixels required to best represent that dimension. However, because small variations in defined dimensions can result in large variations in pixel representations (due to round-off errors), some CONTROL-DIMENSIONS must be adjusted. For this reason, a system is provided whereby one CONTROL-DIMENSION is established as the STANDARD, and all others are established based on their variation from the STANDARD. In this way, the STANDARD influences the overall "weight" of the output design and that "weight" remains constant throughout the typeface.

1.5 Sequencing of Character Associations

Not all character dimensions can be controlled as scaling takes place. Some must be allowed to vary so that others can be maintained. For example, if the two stems and the overall width of a lowercase "n" are constrained, then the counter of the character must be allowed to vary from its original design. Otherwise, there is an unresolvable conflict. However, it is best to provide some compromise in controlling character dimensions by exercising partial constraint over certain dimensions. This is determined by the SEQUENCING of linked or ASSOCIATED SKELETAL points. Therefore, as will be indicated in the section on DATA DESCRIPTION, the sequence in which SKELETAL processing takes place is important and, therefore, will be defined by designers.

1.6 Italics

Italics provide a special "challenge". The concepts of GRID ALIGNMENT and CONTROL DIMENSIONS cannot be strictly applied to an italic design, the reason being that these concepts depend on the local scaling of a contour segment between SKELETAL points to provide alignment and control. However, this local scaling can cause the italic angle to be altered from character to character and even within a character, thereby producing optically disturbing results.

Therefore, a special approach is taken with italic typefaces. This approach incorporates all the concepts presented above, however, with fewer controls. Additionally, the italic character must be unitalicized at one step during the processing, processed as above, and reitalicized. The result is that italic angles are preserved, key contour points are GRID ALIGNED, and certain dimensions are controlled. However, some adjacent stroke "run" lengths will not be optimum, thereby producing some undesirable "flats" and "windowed" pixels.

2.0 Data Description

The basis for successful scaling under the present invention lies in correct definition of the data. This data consists of two major pieces: (1) the character contour (or series of contours) which defines the character shape, and (2) the "intelligence" which governs the scaling of the character contour(s). Sample data is presented below.

2.1 Character Contour Data

The character contour can be described in any number of ways, as long as each contour is continuous and closed (i.e., the contour end must meet the contour beginning). For storage of the character contours in the example, a vector/spline point representation has been chosen. This representation will be virtually resolution independent, making it possible to generate vector outlines at a level of detail appropriate for a particular application.

The final quality of the bit-map produced for a low-resolution output device is dependent on the quality of the contour description.

The following are the data arrays presently used for describing character contours.

| | |
|---|---|
| COMMON /CHRIN/: | |
| XIN(256),YIN(256) = | List of coordinates describing character contour before scaling. |
| NUMI = | number of coordinates in list (maximum presently = 256). |
| IPEN(256) = | Y-class assignments for XIN,YIN coordinates. |
| COMMON / CHROU/: | |
| XOU(256),YOU9256) = | List of coordinates describing character contour after manipulation to align with output grid. |

2.2 Skeletal Data Description

The SKELETAL data provides the "intelligence" for scaling. It can be divided into several categories, each supporting one or more of the concepts presented above.

(a) Skeletal Points: At the foundation of the process of the invention are the "skeletal points". These points are a subset of the coordinates used to describe the character contour, and are chosen from the coordinate list because these points require controlled alignment with the output bit-map grip. Skeletal points are most often extreme x-values or extreme y-values. They exist in two sets: x-skeletal points to operate on X-coordinates and y-skeletal points to operate on Y-coordinates.

(b) Associated Skeletal Points: "Associated points" comprise a subset of all skeletal points. In fact, most skeletal points are associated skeletal points because of the "tree-like" linking of skeletal points through their associations. Association is in one direction only (toward the "branches"), i.e., as skeletal points are altered, their associated points are also altered. If the associated point is altered additionally, it has no impact on its associat-or (toward the "root"). Generally, it can be said that a skeletal point can have more than one associated point, but no associated point can be an associated point in two root systems.

For this reason, when in special situations it is necessary for two separate roots to "converge" at the same associated point, it is necessary to automatically insert a duplicate point. In this way, the designated point becomes two separate points, each on its own root.

(c) Alignment Attribute: Not all skeletal points are intended to be aligned with the grid. Non-alignment makes it possible to maintain the angles and weight of major diagonal character strokes. It also permits the assignment of skeletal points simply for bounding scale segments along the character contour. Therefore, each skeletal point has an alignment attribute switch, which is set "on" or "off".

(d) X and Y dimensions: Each link between a skeletal point and an associated skeletal point is via some established dimension, either the NULL DIMENSION (in which case the output dimension in pixels is actually determined directly from the input contour dimension by round-off), or a specific dimension selected from a pre-established X or Y DIMENSION list. It should be noted here that the X and Y DIMENSION list holds dimensions as measured in input units (i.e., those used to define the character contour). At scale time, these dimensions are converted so as to represent dimensions relative to the grid pixel dimension.

X and Y Dimensions exist as either GLOBAL DIMENSIONS, where the specified dimensions are used throughout the entire typeface, or LOCAL DIMENSIONS, where the specified dimensions are used only in a specific character. GLOBAL DIMENSIONS are stored with the typeface. LOCAL DIMENSIONS are stored with each character.

(e) Y-Classification: Each coordinate used to describe the character contour is linked to a "band" running horizontally through a line of text. Y-CLASSIFICATION data consists of two parts: (1) Y-CLASS or "band" definition, and (2) coordinate ASSIGNMENT. A Y-CLASS is defined by two y-values, one at the top, and one at the bottom. For example, the Y-CLASS for all lowercase characters is defined by the y-value of the baseline and the y-value of the lowercase height. All contour coordinates that must be positioned relative to these two y-values are therefore linked or ASSIGNED to this Y-CLASS. At the same time, in the same character however, there may be an additional requirement for aligning the descender of the character. The "band" between the baseline and the bottom of the descender is defined as a Y-CLASS and each coordinate along the contour describing the descender is ASSIGNED to that Y-CLASS.

As in the case of the X and Y DIMENSIONS, Y-CLASS definition is established in input units and then converted to output pixels at scale time.

(f) Italic Angle: For purpose of special processing of italic typefaces, the angle of each character is stored with the character skeletal data. This angle is used for "unitalicizing" the character during the processing of all Y-coordinates thereby preventing any alteration of the angle in the final output.

Additionally, the major italic angle in the typeface is stored globally for the entire typeface. This angle is used to "re-italicize" each character after Y-processing. In this way, slight variations in angles which are designed into each character for optical reasons will be eliminated at low resolution.

(g) Processing Sequence: The sequence in which SKELETAL points are processed is list directed. The order of the list must be carefully established so that the position of most important points along the contour are established first. Only then can less important points be positioned. It will be appreciated that selection of the most important points along the contour (and therefore the list order) is a matter of design choice.

The following is a definition of the data variables presently used for the "scaling intelligence".

| | |
|---|---|
| COMMON /PARAM/: | |
| XPIX,YPIX = | X and Y pixel dimension (distance between grid lines) as measured in the input character contour coordinate units. These are calculated at scale-time based on the point size and resolution of the output and of the master data. |
| COMMON /SKEL/: | |
| NLOOP = | Number of closed loop contours in this character. |
| LPEND(20) = | Array containing indices of last XIN,YIN coordinates in each closed loop contour. |
| NCLAS = | Number of Y-classes or horizontal "bands" in character. |
| ICLS(10,2) = | Y-class definitions. (N,1) = bottom of Y-class "band". |

| | |
|---|---|
| | (N,2 = top of Y-class "band". |
| NUMS = | Number of skeletal points (maximum = 96). |
| ISK(96,10) = | Skeletal array holding indexes to skeletal coordinates, associations, dimensions, etc. |
| (N,1) = | index to XIN,YIN coordinate array defining skeletal point. Positive index value indicates "grid alignment". |
| (N,2) = | number of skeletal points which are associated with this skeletal point. |
| (N,3) = | 1 if X skeletal point, 2 if Y skeletal point. |
| (N,4) = | Associated skeletal |
| (N,4) = | point indices combined |
| (N,4) = | with pointers to X or |
| (N,4) = | Y controlled-dimensions |
| (N,4) = | (further description |
| (N,4) = | in ASSOCY.FTN). |
| (N,10) | |
| IXDIM(32) = | Controlled-dimension for X pointed to by associated skeletal points. |
| IYDIM(32) = | Same for Y. |
| COMMON /ITALIC/: | |
| ANGIT = | Italic angle for this character |
| GLANGT = | Global italic angle (average for entire typeface). |

3.0 Sequence of Operation

The following provides a sequence of steps required to adjust the character contour for a specific point size/-resolution, prior to "filling" the contour with "bits".

3.1 Establish Output Point Size and Resolution

The point sizes and resolutions of both the input character contour data and the output "bit-map" data are used to calculate the pixel X and Y dimensions for the "bit-map" grid. Details of this conversion are presented in INPNCS.FTN below.

3.2 Load Data

Both CHARACTER CONTOUR and SKELETAL data are loaded into memory. Details of internal data formats are presented in LOADCH.FTN and LOADSK.FTN below.

3.3 Un-Italicize

If character is classified as ITALIC (by the presence of an angle other than zero), then it must be un-italicized before any processing is done which might after its established angle. Detail is presented in UNITAL.FTN below.

3.4 Y-Class Processing

Defined segments in the character contour are individually scaled to provide alignment and correct internal proportion within a specified Y-CLASS. Detail is presented in LPSCAL.FTN.

3.5 Conversion of X and Y Dimensions to Output Pixels

Established global and local dimensions are defined in terms of input data units (units used to describe the character contour). Each must be converted to output pixels based on the pixel dimension as established in INPNCS.FTN. A more detailed explanation is presented in DIMPIX.FTN below.

3.6 Y-Grid Alignment and Y-Associations

Y-skeletal points are processed for alignment or non-alignment with the grid as specified by the ALIGNMENT ATTRIBUTE SWITCH. As each individual skeletal point is shifted up or down, its associated skeletal points are shifted in the same amount. This process continues until the list of Y-skeletal points is exhausted. Details are present in GRYAJ.FTN/GRXAJ.FTN and ASSOCY.FTN/ASSOCX.FTN below.

3.7 Y-Processing of Segments Between Skeletal Points

Because skeletal points are a subset of the coordinates defining the character contour, they serve to mark the ends of segments along the character contour. these segments must be "stretched" or "compressed" to allow the skeletal points to align appropriately with the grid, while still maintaining a smooth and aesthetic contour. This is accomplished by the linear scaling of Y-segments in two separate processes. Details are presented in XPROC.FTN/YPROC.FTN.

3.8 Italicization

When appropriate, the character is re-italicized. Detail is presented in ITALIC.FTN below.

3.9 X-Grid Alignment and X-associations

After re-italicization (if appropriate), X-skeletal points are processed for alignment or non-alignment with the grid as specified by the ALIGNMENT ATTRIBUTE SWITCH. As each individual skeletal point is shifted left or right, its ASSOCIATED skeletal points are shifted in the same amount. This process continues until the list of X-skeletal points is exhausted. Details are presented in GRXAJ.FTN/GRAJ.FTN and ASSOCX.FTN/ASSOCY.FTN below.

3.10 X-Processing of Segments Between Skeletal Points

Because skeletal points are a subset of the coordinates defining the character contour, they serve to mark the ends of segments along the character contour. These segments must be "stretched" or "compressed" to allow the skeletal points to align appropriately with the grid, while still maintaining a smooth and aesthetic contour. This is accomplished by the linear scaling of X-segments in two separate process. Details are presented in XPROC.FTN and YPROC.FTN.

3.11 X-Shift

The key to the generation of optimum length adjacent stroke "runs" in the resulting "bit-map" character is the "proper" alignment of the X and Y skeletal points with the grid. A Y-skeletal point aligns properly when its Y-value is evenly divisible by the Y pixel dimension. An X-skeletal point aligns properly when its X-value minus one-half the X pixel dimension is evenly divisible by the X pixel dimension. For simplicity of processing, an X-skeletal point is considered to align when its X-value is evenly divisable by the X pixel dimension. At this point in processing, it is, therefore, necessary to shift all X-values by adding one-half the X pixel dimension. Detail is provided in NCSBLO.FTN below.

3.12 Bit-Map Creation

At this point, the character contour has been manipulated to create an outline definition of the character, which, if filled with "bits", will provide a good approximation of that character. The FILL technique is basically one of processing each vector, in sequence, around the newly established contour, searching for all intersections of vectors with X-grid lines. The resulting intersections are STROKE TRANSITIONS, i.e., locations at which the bit polarity is to be reversed for that and subsequent bits in that stroke. Upon completing this process, one has available a collection of vertical character strokes, each containing an unsorted list of Y-pixels (TRANSITIONS). Once sorted, all odd transitions can be considered the beginnings of "ON" stroke runs, and all even transitions can be considered the beginnings of "OFF" stroke runs.

4.0 SPECIFIC APPLICATION OF THE METHOD OF THE INVENTION

Having described in detail the theory and terminology of the method of the invention, the method will now be applied to a specific application, namely, the manipulation of an illustrative letter "K" as shown in FIGS. 1 through 9. The Figures are drawn to a $\frac{1}{4}"\times\frac{1}{4}"$ grid pattern and are designed to be used as overlays with respect to each other. A portion of the overall grid pattern is provided in each Figure so that the overlays can be registered to the underlying Figure.

Referring now to the drawings, the original character (letter "K") is shown in FIG. 1 and is defined by a set of X/Y coordinate pairs listed in order around the character. The X/Y pairs are indicated by nodes identified by the reference numeral 20 along the character outline in FIG. 1.

Y-values of specific points along the contour fall at or about Key Y-Lines (i.e., character parts which must align vertically from one character in a typeface to another) This example shows the BASELINE, X-HEIGHT, and ASCENDER HT. Y-LINES (which are parallel to the X-axis).

Figure 2:
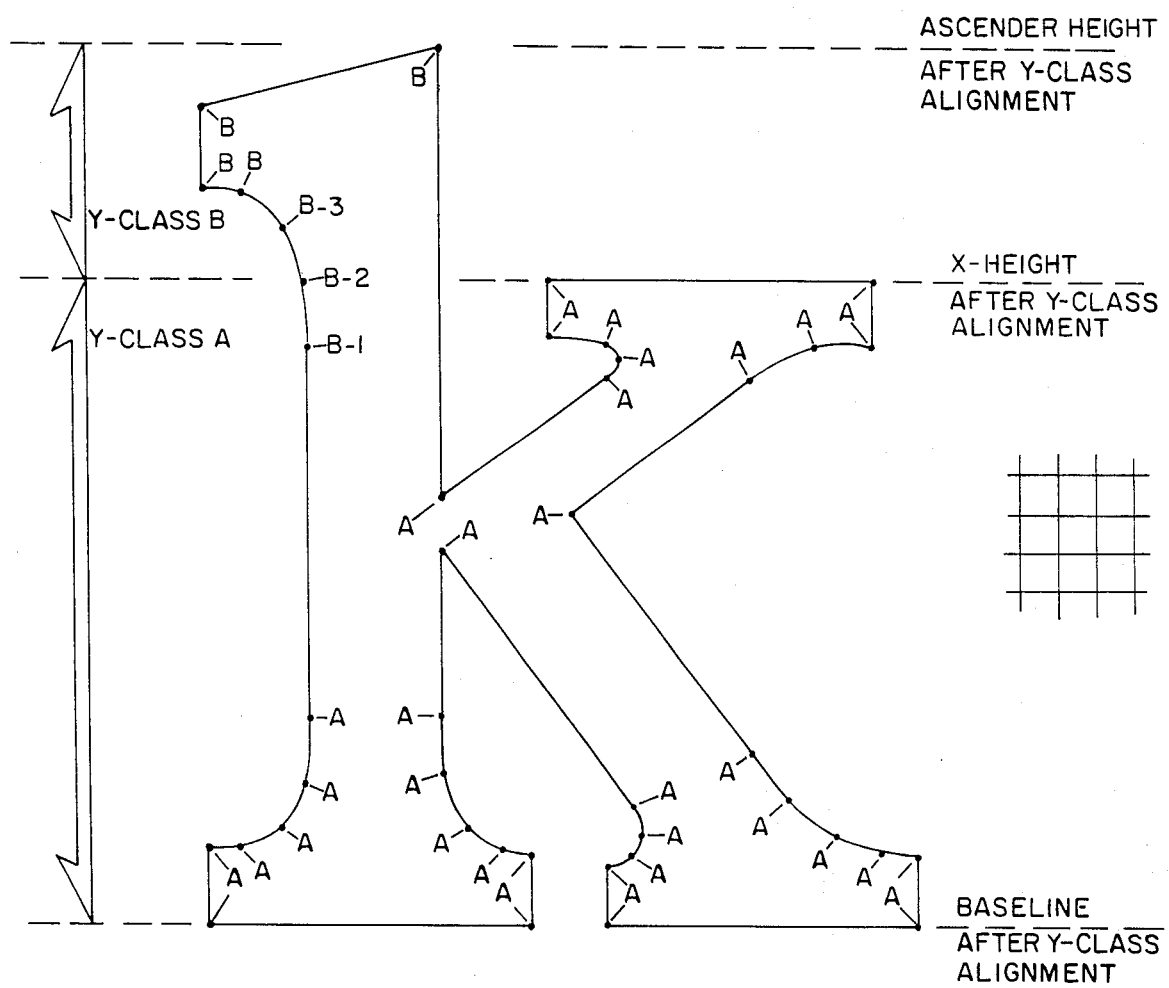
FIG. 2 shows the character of FIG. 1 with the Y-values of the entire character manipulated to bring the absolute position of the Y-lines to sit on an even output pixel or Y-grid line.

FIG. 2 illustrates the manipulation of the entire character in order to bring the absolute positions of the Y-Lines into superposition with respect to an even output pixel or X-axis grid line. Coordinates not sitting exactly on the established Y-Lines are repositioned by linear scaling as determined by their assigned Y-Class. A Y-Class is defined by any combination of two established Y-LINES.

In FIG. 2, the character base line has been rounded downwardly to the nearest X-axis grid line which in turn shifts the entire character downwardly. The X-height and Ascender Height are then rounded to the nearest X-axis grid lines. All points are scaled as determined by the Y-Classes indicated (A or B).

The effect of these manipulations can be seen by comparing the relative positions of A-designted nodes in FIG. 1, with those of FIG. 2. Note that all nodes significant to the x-height portions of the character have been repositioned to bring nodes on or about the baseline and x-height to sit on or about the grid line designated as the baseline pixel or x-height pixel. It should be noted that nodes must not necessarily sit physically between the Y-lines defining the Y-class, as can be seen in FIG. 2, nodes B1 and B2.

Figure 3:
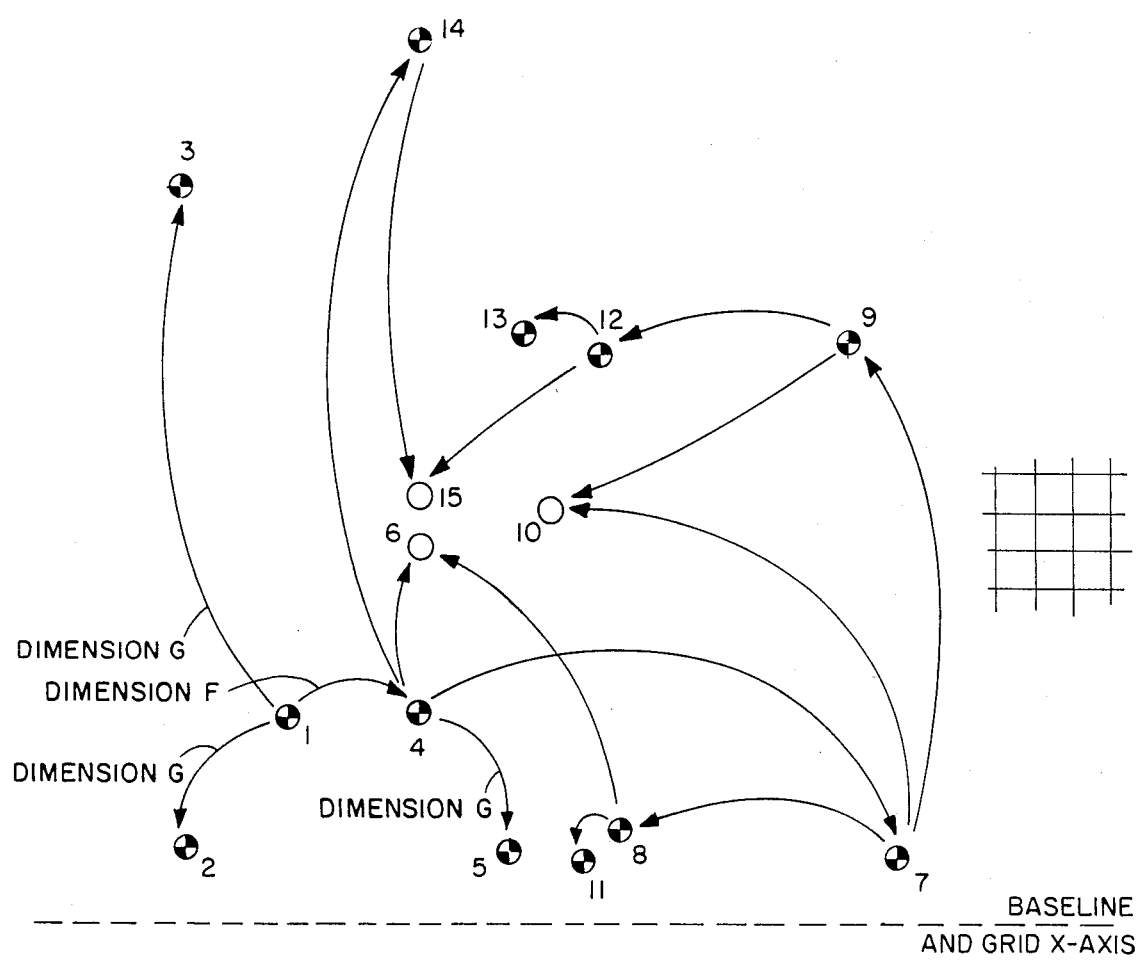
FIG. 3 is a diagram illustrating the manipulation of the character contour to produce an optimum translation to a bit-map by applying and processing skeletal information. The diagram of FIG. 3 is designed for use as an overlay to the FIG. 2 character.

FIG. 3 depicts the manipulation of the character contour to produce an optimum translation to a bit map by applying and processing the skeletal information. This information defines Key SKELETAL points which must be shifted to assume a specific relationship to the output grid, along with a defined structure of related or ASSOCIATED points whose positions after processing are a result of shifts to the related SKELETAL point and their own relative position to the grid.

Where consistency of specific dimensions is important, from character-to-character, or even within a character, CONTROL DIMENSIONS are selected from an established table to override any variation introduced with the actual data. Note that at this point, the only concern is with processing in the X axis.

In the example of FIG. 3, skeletal point #1 is first grid aligned as indicated by the quartered symbol. The tree structure of the SKELETAL data establishes that any shift in SKELETAL point #1 is applied to ASSOCIATED points #2, #3, and #4. The SKELETAL points are indicated by circles which have arrows coming out of, but not into, the circle whereas ASSOCIATED points have arrows comining into the circle. Grid aligned points are indicated by the quartered symbol, while non-grid aligned points are indicated by the open circle symbol. With respect to the ASSOCIATED points, the choice is to (1) shift each of these points and then grid aign them, (2) simply shift them and not grid align them, or (3) move them a specific distance from point #1 as indicated by the presence of a CONTROL DIMENSION.

Points #2 and #3 are processed, but their branches expire. However, additional ASSOCIATIONS branch from point #4, so, after processing point #4, further shifts and alignments are executed as indicated in the diagram. Note that DIMENSION G is used to control the distance between point #1 and points #2 and #3 as well as between point #4 and point #5 to ensure consistent serif lengths. DIMENSION F is used to control the distance between point #1 and point #4 to ensure consistent stem widths from character-to-character.

It should also be noted that point #10 is not grid aligned, but only shifted as determined by manipulation of points #7 and #9. This ensures that the diagonal contours between #7 and #10 and between #9 and #10 do not change with regard to angle. If all such diagonal contour angles remain unchanged, then their relationship from one stem side to another will remain unchanged, thereby avoiding possible unwanted tapering of character strokes.

The obvious conflict of the two SKELETAL points converging on the same ASSOCIATED point, with the possible shifting of the same point in two directions, is resolved by the rules governing this CONVERGENCE. First, no more than two SKELETAL points can converge on one ASSOCIATED point and secondly, a second contour coordinate is inserted into the contour coordinate list at the same position.

Figure 4:
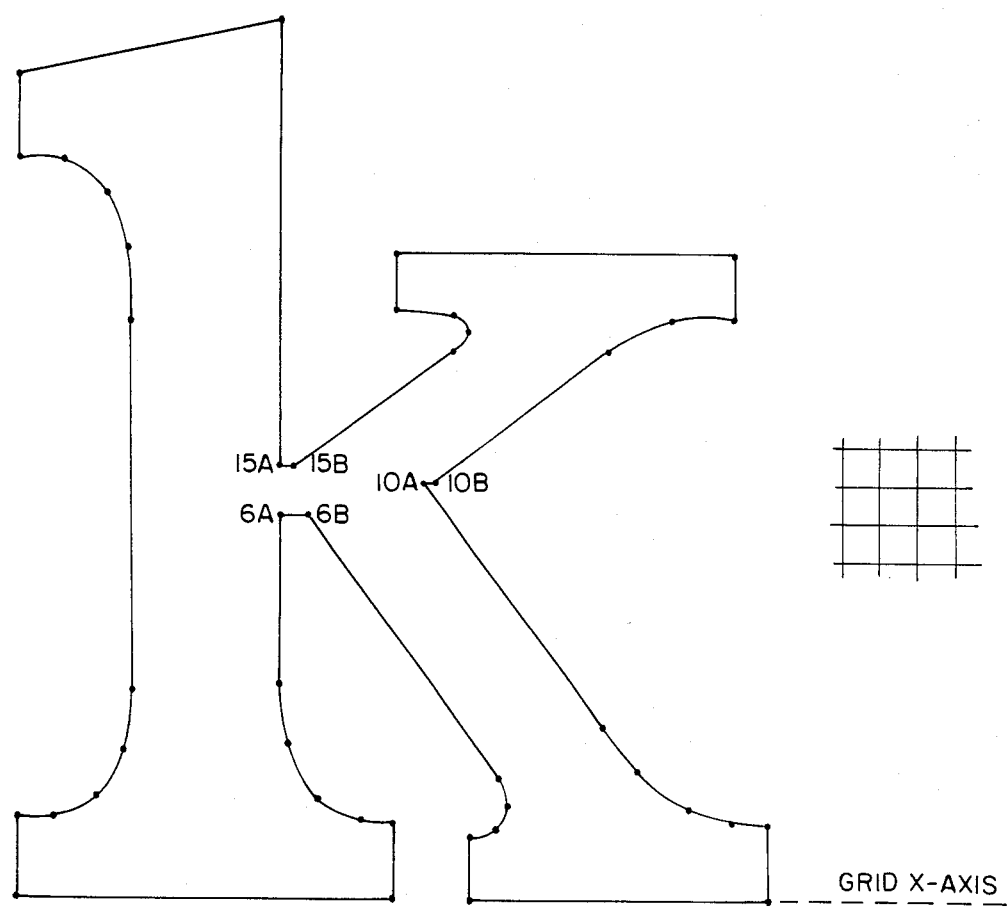
FIG. 4 shows the character of FIG. 2 after the skeletal and associated points are appropriately shifted and grid or non-grid aligned along the X-axis only with all other points along the character contour repositioned by shifting and linear scaling in order to maintain a smooth contour.
Figure 5:
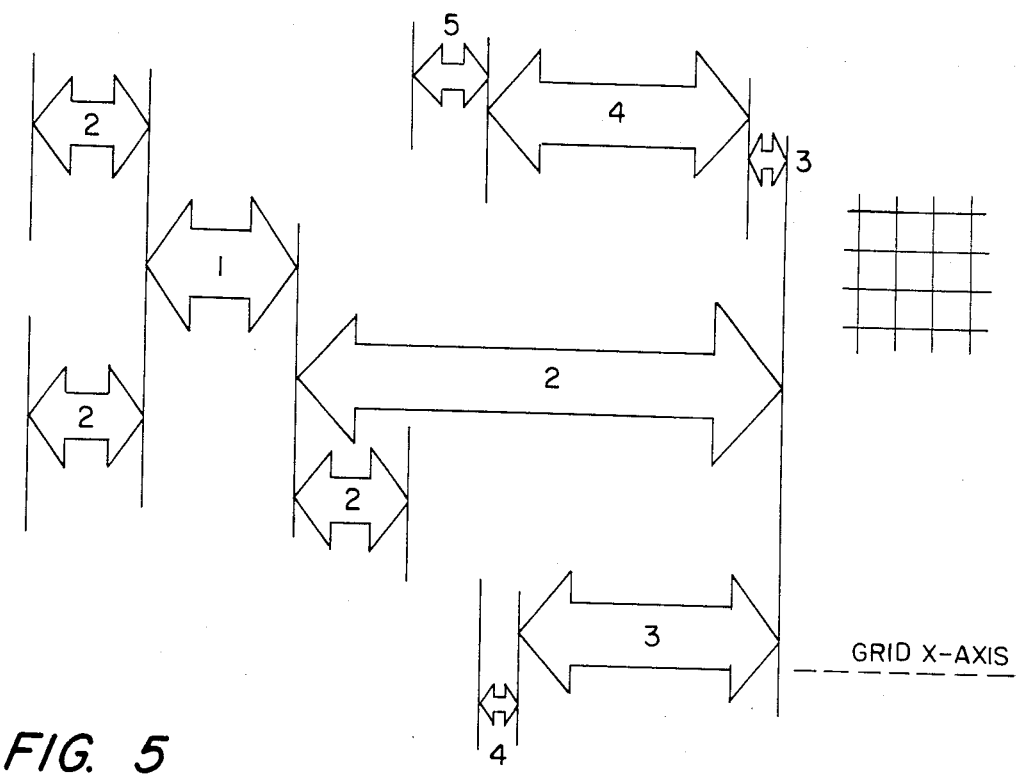
FIG. 5 is a diagram of the sequence of association of skeletal points and dimensions established by grid alignment. The diagram of FIG. 5 is designed for use as an overlay to the FIG. 4 character.

Referring to FIG. 4, after the SKELETAL and ASSOCIATED points are appropriately shifted and grid or non-grid aligned, all other points along the contour are repositioned by shifting and linear scaling in order to maintain a smooth contour. Note that points #10 and #15 and #6 not only have been replaced with points #10A and #10B, #15A and #15B, and #6A and #6B, respectively, in order to resolve the CONVERGENCE conflict, but also that they have been shifted appropriately to maintain the diagonal angles. The resulting character, as shown in FIG. 4, illustrates the character after it has been adjusted to the grid along the X-axis only.

The SEQUENCE of associations of SKELETAL points is important to the final solution. As shown in the sequence diagram of FIG. 5, the vertical stem of the "K" is the first character dimension to be established, followed by the length of the serif and the distance from the right side of the stem and the right most point of the character. Because of this, the total character width becomes dependent on the sterif, the stem and the diagonal. All other dimensions are then dependent on those dimensions which were established previously.

Figure 6:
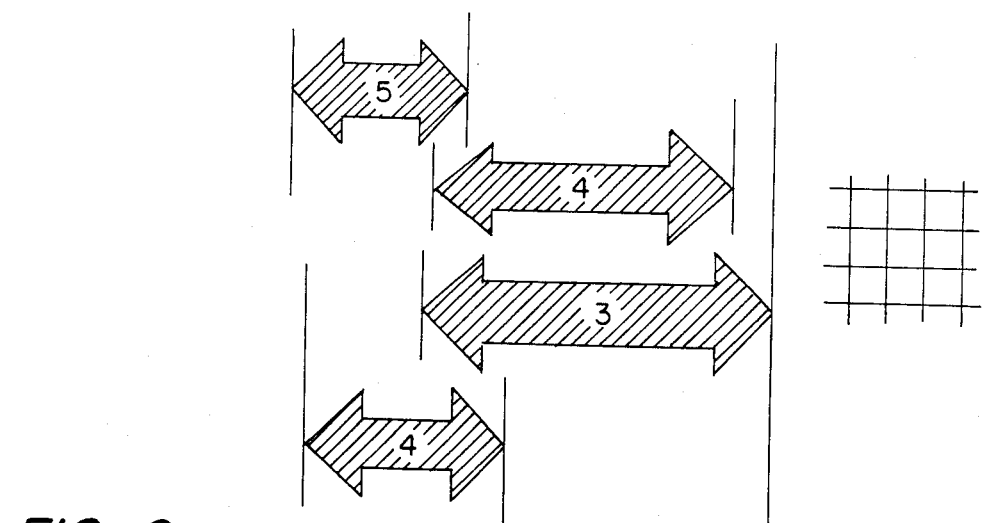
FIG. 6 is a diagram of the sequence of association of skeletal points and the dimensions established by non-grid alignment. The diagram of FIG. 6 is designed for use as an overlay to the FIG. 4 character.

FIG. 6 illustrates the sequence of character dimensions established by non-grid alignment. Again, this Figure is designed as an overlay for use with FIG. 4.

Figure 7:
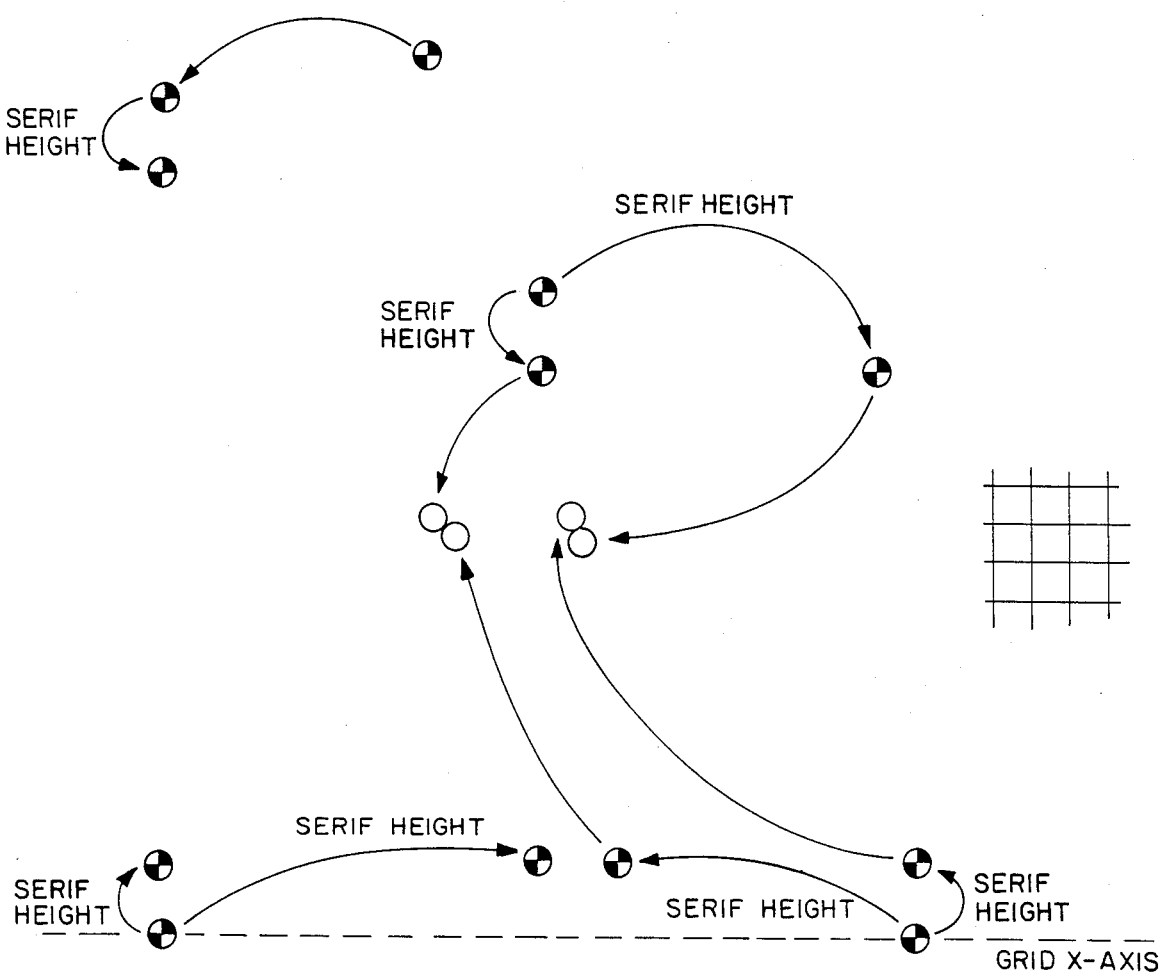
FIG. 7 is a diagram illustrating the manipulation of the character contour along the Y-grid axis and is intended as an overlay to FIG. 8.
Figure 8:
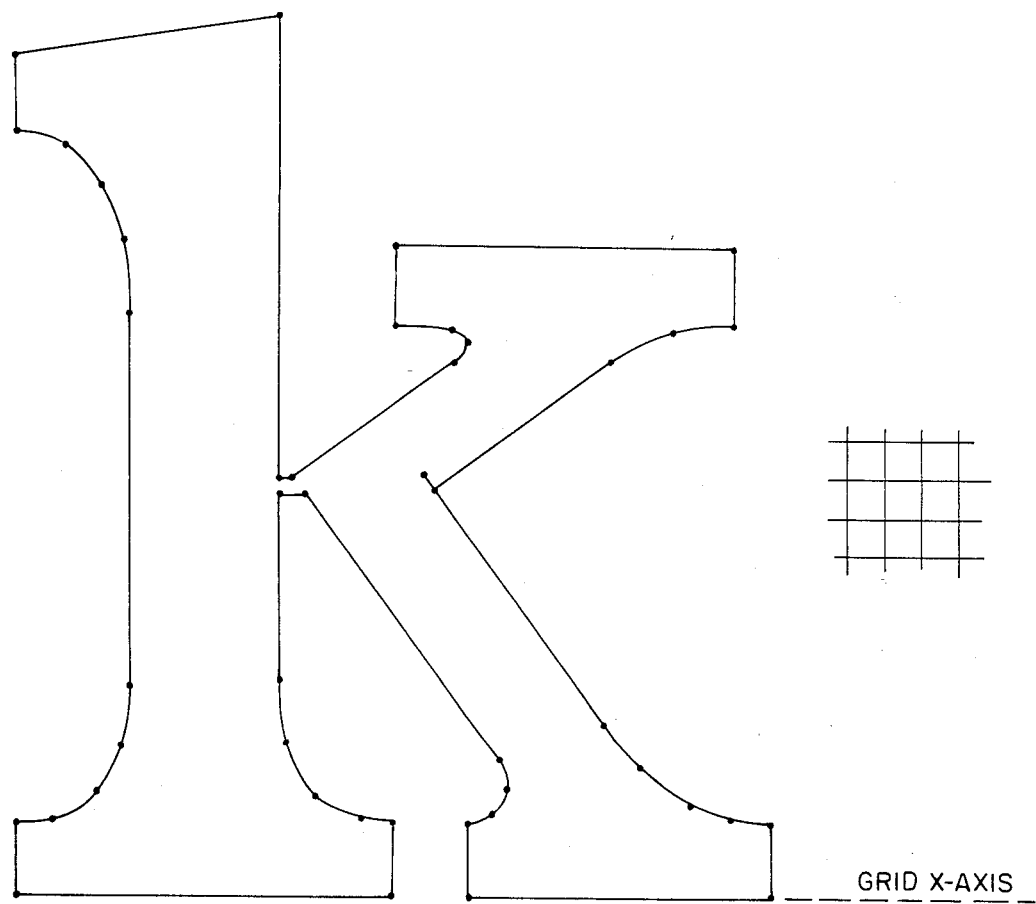
FIG. 8 shows the character after the manipulation depicted in FIG. 7.

FIG. 7 depicts the manipulation of the character contours along the Y-axis. FIG. 8 illustrates the results of the FIG. 7 Y-axis manipulations.

Figure 9:
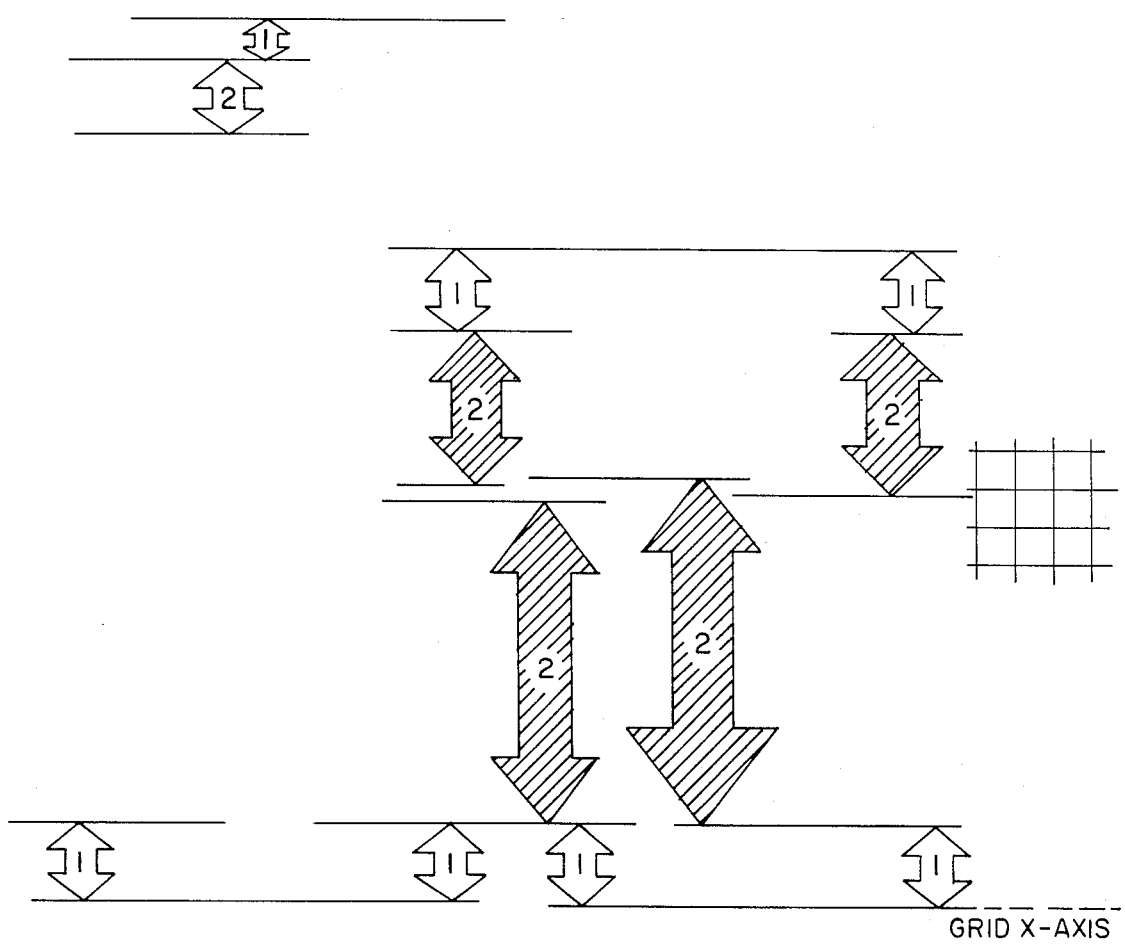
FIG. 9 is a diagram of the sequence of association of skeletal points and the dimensions in the Y-grid axis.

FIG. 9 shows the sequence of associations in the Y-axis. It should be noted that the associations in the Y-axis tend to be less interdependent. Serif height control is carried out at the same level, i.e., each serif begins a new root and is not altered by previously processed serif heights. In addition, note that once again the diagonals are treated in order to maintain the angle of the diagonal.

At this point, it should be observed that FIGS. 1 through 9 show Y-line processing, then X-axis manipulation of the character and thereafter Y-axis manipulation. In contrast, the theory portion discussed above sets forth the reverse sequence of operation, i.e., Y-axis and then X-axis manipulation after the initial Y-line processing. Either sequence can be employed in practicing the method of the invention for non-italic characters. Additionally, for non-italic characters, the sequence of X-axis, then Y-lines and thereafter Y-axis processing can be utilized.

In the case of italic characters, only one processing sequence can be employed, namely, Y-line, Y-axis and then X-axis. It should be observed that in both the italic and non-italic sequences, the Y-line processing must precede the Y-axis processing.

FORTRAN Routines

The FORTRAN source code for practicing the method of the invention is set forth below.

5.1 BLACK.FTN—MANIPULATE CHARACTER CONTOURS FOR SCALING

The following is the main line for processing individual characters. Two passes are made through the complete SKELETAL point array (ISK): the first locates and processes all Y-SKELETAL references, while the second pass locates and processes all X-SKELETAL references. This approach eliminates the need for SKELETAL data to be presented in a defined order (regarding X and Y data lists), but still ensures that data is processed appropriately for italic typefaces.

```
      COMMON /PARAM/ XPIX, YPIX, XRESP, YRESP    ! PIX DIMENSIONS FOR
      BLACK
      PARAMETER NDMPAR=32                        ! NUMBER OF DIMENSIONS
      PARAMETER NASPAR=10                        ! NUMBER OF ASSOCIATED POINTS
      COMMON /SKEL/
      NLOOP,LPEND(20),NCLAS,ICLS(10,2),NUMS,ISK(256,NASPAR),
    + IXDIM(NDMPAR0,IYDIM(NDMPAR),NANG,ISKIT(128,3)
      COMMON /ITALIC/ ANGIT,GLANGT
      COMMON /CHRIN/ NUMI,XIN(256),YIN(256)      ! INPUT FOR BLACK
      COMMON /CHROU/ NUMO,XOU(256),YOU(256)      ! OUTPUT FOR BLACK
      LUNSRD=1                                   ! LUNS FOR FILE ACCESS
      LUNCHR=2
      LUNSKL==3
      LUNOU=7
      ISTAT-0                                    ! STATUS FOR SRDNXT CALL
      IEN=0                                      ! END POINTER FOR VECTOR ARRAY
      CALL INPNCS                                ! OPERATOR INPUT
    2 CALL SRDBLX (LUNSRD, LUNCHR, LUNSKL,       ! OPEN CHARACTER
      ISTAT)
      FILES
      IF (ISTAT.GE.2) STOP
      CALL LOADSK (LUNSKL)                       ! LOAD /SKEL/ WITH SKELETAL DATA
      CALL LOADCH (LUNCHR,ICH,IL,IR,IB,ID,IU,NREC,IMIN,IMAX,NU)
      CALL DIMPIX (XPIX,YPIX)                    ! CONVERT MEASURED DIMENSIONS TO PIXEL
```

NOTE: References are made to routines for fetching and storing contour data from and to the (XIN,YIN) and (XOU,YOU) arrays. They are FCHIXY, STIRXY, STIRX, and STIRY for (XIN,YIN) and FCHOXY, STORXY, STORX and STORY for (XOU, YOU).

At this point, the actual processing loop begins with the IXYSW switch set for "Y".

```
      IXYSW=2                                    ! PROCESS Y-SKELETAL POINTS FIRST
      ICS=1                                      ! SKELETAL POINTER
      ICV=0                                      ! START OF SKELETAL POINTS
      ISTS=ICS                                   ! START OF SKELETAL POINTS
      ICV=ISK(ICS,1)                             ! FIRST SKELETAL POINT
      CONTINUE
      IF (ISK(1CS,3).NE.IXYSW) GO TO 55          ! SKIP, WRONG COORD SYSTEM
      CALL FCHIXY (ICV,X,Y)                      ! FETCH *IN* X,Y
      IF (1.EQ.IXYSW) CALL GRXAJ (ICS,ICV,X,XX)  ! GRID ALIGN X
      IF (2.EQ.IXYSW) CALL GRYAJ (ICS,ICV,Y,YY)  ! GRID ALIGN Y
      IF (IXYSW.EQ.1) CALL STORX (ICV,XX)
      IF (IXYSW.EQ.2) CALL STORY (ICV,YY)        ! STORE OUTPUT (DIFFERENCE)
      IF (ISK(ICS,2).EQ.0) GO TO 55              ! NO ASSOCIATED POINT
      DO 45 LK=1,ISK(ICS,2)                      ! LOOP THROUGH ALL POINTS ASSOCIATED
      W/THIS
      IF (IXYSW.EQ.1) CALL ASSOCX (ICS,LK,X,XX)  ! PROCESS ASSOC. POINT
      IF (IXYSW.EQ.2) CALL ASSOCY (ICS,LK,Y,YY)  ! PROCESS ASSOC. POINT
   45 CONTINUE
```

```
                                        -continued
55 ICS—ICS+1
ICV=ISK(ICS,1)
IF (ICV.NE.O) GO TO 25                  ! END OF SKELETAL PROCESSING?
IENS+ICS—1                              ! NUMBER OF SKEL PTS THIS LOOP
```

Once processing of the SKELETAL points is complete, indices are set positive to make all future references more direct. In YPROC and XPROC, contours located between SKELETAL points are "stretched" and "compressed" to produce smoothly scaled characters.

cific point size and/or resolution is accomplished by scaling the "bit-grid", rather than scaling the character contour. That is, a lower resolution or smaller point size is generated by using larger increments between X and Y grid lines.

To this end a method must be provided for control-

```
        DO 65 LS=1,NUMS                 ! SET ALL NEGATIVE SKELETAL POINTERS POSITIVE
        IF (ISK(LS,L).LT.0.AND.ISK(LS,3).EQ.IXYSW) ISK(LS,1)=ISK(LS,1)
  65    CONTINUE
        IF (IXYSW.EQ.1) GO TO 75        ! SECOND PASS IS X
        CALL YPROC (ISTS,IENS)          ! "STRETCH" AND COMPRESS X-SEGMENTS
        IF (ANGIT.NE.O) CALL ITALIC
        IXYSW=1
        GO TO 5                         ! GO BACK FOR X PROCESSING
  75    DO 80 LS=1,NUMS
        IF (ISK(LS,1).LT.0)ISK(LS,1)=ISK(LS,1)*—1
        CALL XPROC (ISTS,IENS)          ! "STRETCH" AND COMPRESS X-SEGMENTS
  80    CONTINUE
```

Because X-SKELETAL points must actually align between grid lines, the X-SKELETAL list is searched for the minimum X-value. This value is used to compute the offset for all X-values to bring aligned X-SKELETAL points between grid lines.

ling the grid increments (output device pixel size). It should be observed that there are two unique pixel systems: that of the output device (e.g., 300 pixels/inch on a Canon laser printer, Model LBP-CX), and that of the input data (e.g., 1302 pixels/inch by 1563 pixels-

```
XXMNT=XOU(ISK(1,1))
DO 567 LS=1,NUMS
IF (XOU(ISK(LS,1)).LT.XXMNT) XXMNT=XOU(ISK(LS,1))
(illegible) .LT.XXMNT XXMNT=XOU(ISK)LS,1))
567 CONTINUE
GO TO 569
569 HAFPIX=XPIX/2.—XXMNT
CALL NCSBLO (LUNOU,ICH,IL,IR,IB,ID,IU,NREC,IMIN,IMAX,HAFPIX)    ! DONE
CALL RQFIX (ISWCH(3))                                            ! INVOKE FIB (FILL CONTOUR)
GO TO 2                                                          ! RETURN FOR MORE CHARACTERS
```

5.2 INPNCS.FTN—SETTING SALE PARAMETERS

Actual scaling of the character for a specific point size and/or resolution is accomplished by scaling the "bit-grid", rather than scaling the character for a spe- /inch, as scanned for the Compugraphic Model 8600/8400 typesetters).

The following formula is therefore used to determine the grid increments (output pixel dimension) as measured in data units (input pixels):

```
            XPIX =                      (INPTX * INRESX)/(OUPTX * OURESX)
                                        and
            YPIX =                      (INPTY * INRESY)/(OUPTY * OURESY)
            where:
            XPIX =                      horizontal pixel dimension for "bit-grid"
            INPTX =                     input point size (64 point 8600 master)
            INRESX =                    input horizontal resolution (1302 pels/inch)
            OUPTX =                     output point size
            OURESX =                    output horizontal resolution
            YPIX =                      vertical pixel dimension for "bit-grid"
            INPTY =                     input point size (64 point 8600 master)
            INRESY =                    input vertical resolution (1563 pels/inch)
            CUPTY =                     output vertical point size
            CURESY =                    output resolution
        SUBROUTINE INPNCS
        COMMON /PARAM/ XPIX,YPIX,XRESP,YRESP         ! PIX DIMENSIONS FOR BLACK
        PARAMETER NDMPAR=32                          ! NUMBER OF DIMENSIONS
        PARAMETER NASPAR=10                          ! NUMBER OF ASSOCIATED POINTS
        COMMON /SKEL/ NLOOP,LPEND(20),NCLAS,ICLS(10,2)NUMS,ISK(256,NASPAR
       *IXDIM(NDMPAR),IYDIM(NDMPAR),NANG,ISKIT(128,3)
        COMMON /ITALIC/ ANGIT,OFFIT,HAFPIX
        WRITE (5, 12)
   12   FORMAT (' ENTER X-RES/PT, Y-RES/PT')
        READ (5,14), XRESP, YRESP
```

```
14  FORMAT (2F10.0)
    XPIX=(64.*1302.)/XRESP
    XPIX-(64.*1563.)/YRESP
    RETURN
    END
```

5.3 LOADSK.FIN—LOAD SKELETAL DATA place as the character contour is loaded. Relevant header data is also returned from this routine.

```
     Input:
     LUN =    Logical unit
     Output:
     ICH =    CHARACTER NUMBER
     IL =     left sidebearing in input units
     IR =     right sidebearing in input units
     IB =     character baseline - may not be significant as it
              should be a constant (1536 for the Compugraphic Model
              8600/8400 data)
     ID =     reserved
     IU =     typesetter unit value (unit width)
     NREC =   width in input pixels
     IMIN =   reserved
     IMAX =   reserved
     NUM =    reserved
     SUBROUTINE LOADCH (LUN,ICH,IL,IR,IB,ID,IU,NREC,IMIN,IMAX,NUM
     COMMON /CHRIN/ NUMI,XIN(256),YIN(256)          ! INPUT FOR BLACK
     COMMON /CHROU/ NUMO,XOU(256),YOU(256)          ! OUTPUT FOR BLACK
     IC=0              ! INITIALIZE COORDINATE COUNTER
     IPNLAS=0    ! LAST PEN VALUE (Y-CLASS ASSIGNMENT)
     READ )LUN,12,END=500) ICH,IL,IR,IB,ID,IU,NREC,IMIN,IMAX,NUM
  12 FORMAT (1016)
```

Data is loaded directly to the appropriate SKELETAL data areas.

Each coordinate (IX,IY) is read from disk, with its sequence number (NU) and its Y-CLASSIFICATION

```
     Input:
     LUN = Logical unit number.
     SUBROUTINE LOADSK (LUN)
     PARAMETER NDMPAR=32                             ! NUMBER OF DIMENSIONS
     PARAMETER NASPAR=10                             ! NUMBER OF ASSOCIATED POINTS
     COMMON /SKEL/ NLOOP,LPEND(20),NCLAS,ICLS(10,2),NUMS,ISK(256,NASPAR
   + IXDIM(NDMPAR),IYDIM(NDMPAR),NANG,ISKIT(128,3)
     COMMON /ITALIC/ ANGIT, GLANGT
     NUMS=0
     READ (LUN,8) NDIM,(IXDIM(LS),LS=1,NDIM)         ! READ X-DIMENSIONS
     READ (LUN,8) NDIM,(IXDIM(LS),LS=9,NDIM+8)
     READ (LUN,8) NDIM,(IXDIM(LS),LS=17,NDIM+16)
     READ (LUN,8) NDIM,(IXDIM(LS),LS=25,NDIM+24)
     READ (LUN,8) NDIM,(IYDIM(LS),LS=1,NDIM)         ! READ Y-DIMENSIONS
     READ (LUN,8) NDIM,(IYDIM(LS),LS=9,NDIM+8)
     READ (LUN,8) NDIM,(IYDIM(LS),LS=17,NDIM+16)
     READ (LUN,8) NDIM,(IXDIM(LS),LS=25,NDIM+24)
   8 FORMAT (1616)
     READ (LUN,12) NLOOP,(LPEND(LS),LS=1,NLOOP)      ! READ LOOP ENDS
  12 FORMAT (2116)
     READ (LUN,12) NCLAS,((ICLS(LS,LSS),LSS=1,2),LS-1,NCLAS)    ! READ
     Y-CLASSES
     READ (LUN,8) IANG                               ! ITALIC ANGLE (*100)
     ANGIT=IANG
     ANGIT-TAN(ANGIT/100.*.0174533)                  ! ANGLE = ANGLE * 100
                                                    ! STORE TANGENT
     IF (IANG.EQ.0) ANGIT=0                          ! MAKE SURE!
  10 NUMS=NUMS+1                                     ! COUNT SKELETAL ENTRIES
     READ (LUN,12,END=1000) ISK(NUMS,1),ISK(NUMS,2),ISK(NUMS,3),
   + (ISK(NUMS,LS+3),LS=1,ISK(NUMS,2)).
1000 NUMS=NUMS-1
     RETURN
     END
```

5.4 LOADCH.FTN—LOAD CHARACTER CONTOUR

A single character is loaded from a file opened in a previous routine. Processing of coordinates relative to their respective assigned Y-CLASSES presently takes (IPEN). IPEN indicates which Y-CLASS (1–10) the coordinate is in. However, the value of IPEN is zero when used to indicate the beginning of a new closed loop. (This is redundant, as the LPEND array in the SKELETAL data likewise defines closed loops.) In cases where IPEN is a nonzero, the coordinate is passed to LPSCAL for "loop-scaling" to adjust the coordinates for Y-CLASS alignment.

```
50   READ (LUN,14,END=500) NU,IX,IY,IPEN
14   FORMAT (416)
     IC=IC+1
     XIN(IC)=IX
     YIN(IC)=IY
     IF (IPEN.EQ.0) GO TO 75
     CALL LPSCAL              ! MAKE Y-SCAL CHANG
     (IPEN,XIN(IC),
     YIN(IC),IPNLAS)
     GO TO 50
75   IF (IC.EQ.1) GO TO 80
     XIN(IMEM0=XIN(IC-1)      ! START EQUALS END
     YIN(IMEM)= YIN(IC-1)
80   IMEM=IC                  ! REMEMBER START
     GO TO 50
500  NUMI=IC                  ! NUMBER OF
                                COORDINATES
     NUMO=IC
     XIN(IMEM)=XIN(IC)
     YIN(IMEM)=YIN(IC)
     DO 700 j=1,256
     XOU(J)=0.                ! INITIALIZE OUTPUT
                                ARRAY
700  YOU(J)=0.
     RETURN
     END
```

5.5 LPSCAL.FTN—ADJUSTMENT OF CHARACTER WITHIN Y-CLASS

As mentioned above, each character must be aligned vertically within a "band" or series of bands" running horizontally through the line of text. These "bands" are referred to as Y-CLASSES. Each Y-CLASS is defined at the top and bottom by a pair of discreet y-values, which, because of their particular importance to all characters, must fall evenly on a pixel boundary (gridline). The intent is to be able to vertically control any portion of a character contour, whose position (relative to these y-values) will effect the optical alignment of text from character to character. Major y-lines, such as the baseline, cap height, descender level, etc., generally establish these y-values. Contours which are located "between" them are offset and scaled so as to bring the specified y-values to grid-align.

It is not necessary for all coordinates defining a particular contour to actually sit within the Y-CLASS between the y-values). Often, small segments of contours protrude outside a given Y-CLASS. However in order to ensure smooth and aesthetic contours, the protruding segments are treated in the same way as those within the Y-CLASS.

The following routine is used to process a single set of coordinates along a character contour. On each call, a new point (X,Y) is offset and scaled based on its Y-CLASS (IC), as defined by two y-values, ICLS(IC,1) and ICLAS(IC,2). Because, successive points along a contour tend to fall within the same Y-class, with only occasional changes, the offset and scale need to be calculated only when a contour passes from the last Y-CLASS (ICLAST) into the current (IC),

```
Input
IC =         present Y-class number
X,Y =        single coordinate set
ICLAST =     last Y-class number
Output:
ICLAST =     update Y-class number
X,Y =        new coordinate position
```

```
SUBROUTINE LPSCAL (IC,X,Y,ICLAST)
PARAMETER NDMPAR=32    ! NUMBER OF
                         DIMENSIONS
PARAMETER NASPAR=10    ! NUMBER OF
                         ASSOCIATED POINTS
COMMON /SKEL/
NLOOP,LPEND(20),NCLAS,ICLS(10,2),NUMS,
ISK(256,NASPAR), + IXDIM(NDMPAR),IYDIM(NDMPAR),
NANG,ISKIT(128,3)
COMMON /ITALIC/ ANGIT,GLANGT
COMMON /PARAM/ XPIX,YPIX   ! PIX DIMENSIONS
                             FOR BLACK
```
Note: With an italic typeface, where the maintenance of a consistent stroke angle is a consideration, the character must be "unitalicized" prior to any processing which alters a Y-coordinate.
```
IF (ANGIT.NE.0.) CALL UNITAL    ! STRAIGHTEN ITALIC
( ),Y)
```
Note: Skip if Y-CLASS offset and scale factor have already been calculated for current Y-CLASS.
```
IF (IC.EQ.ICLAST) GO TO 100
```

To calculate the OFFSET and SCALE FACTOR needed to bring the Y-values, (ICLAS(IC,2)), to align with the grid we just calculate and offset for the baseline (constant 1536 in 8600/8400 data) to bring it to align evenly with a pixel boundary (grid-line). In this way, must Y-CLASS heights are measured accurately from the baseline. Second, the nearest gridlines to the Y-values defining the Y-CLASS are determined. Third, the SCALE FACTOR required to spread the character contour between these two gridlines is calculated.

```
IORIGN=1536./YPIX+.5            ! ORIGIN FROM WHICH
                                  ALL YCLASS ARE
                                  MEASURED
ORIGIN=IORIGN*YPIX-1536.
YBLINE-ICLS(IC,1)+ORIGIN        ! + OFFSET TO BRING
                                  15236 TO BL PIX
IBLINE=YBLINE/YPIX+.5           ! ADJUST BOT LINE TO
                                  NEAREST GRID
BLINE=IBLINE+YPIX
YCLINE=ICLS(IC,2)+ORIGIN        ! + OFFSET FOR BL
ICLINE=YCLINE/YPIX+.5           ! ADJUST CAP LINE TO
                                  NEAREST GRID
CLINE=ICLINE*YPIX
YSCAL-(CLINE-BLINE)/            ! NOW FIGURE SCALE
(YCLINE-YBLINE)
```

Finally, the new Y-coordinate in the character contour is determined by first calculating the point's Y-CLASS (Y+ORIGIN-YBLINE). Scaling it (*YSCAL), and finally adding back the new Y-CLASS bottom (BLINE).

```
100    Y-(Y+ORIGIN-YBLINE)*YSCAL+BLINE
       ICLAST=IC
       RETURN
       END
```

5.6 UNITAL.FTN—UNITALICIZE AN ITALIC FOR Y-PROCESSING

Because of major visual feature of a Latin typeface is the constant rhythm of the vertical stems both in spacing and in weight, and because the "vertical" stems of an italic are not vertical at all, it is necessary to "unitalicize" each character prior to any Y-processing. Failure to do so will result in an uncontrolled adjustment to the major italic angles within the character. One side of a stem might be skewed in one direction while the other side of the same stem might be skewed in the other, resulting in a tapered stem.

When a character is unitalicized, its stems should become approximately vertical. Adjusting the Y-values of such a vertical has no effect on its angle. Upon completing all Y-adjustments, the character is italicized as described in ITALIC.FTN.

The following routine is used to "unitalicize" a pair of coordinates. The approach is technically to "unskew" the data by adding to each x-value the product of the Y-value and the tangent of the italic angle.

```
Input:
X,Y =  pair of coordinate values describing a single contour
       point.
SUBROUTINE UNITAL (X,Y)
PARAMETER NDMPAR=32    ! NUMBER OF
                         DIMENSIONS
PARAMETER NASPAR=10    ! NUMBER OF
                         ASSOCIATED POINTS
COMMON /SKEL/ NLOOP,LPEND(20),NCLAS,ICLS(10,2),
NUMS,ISK(256,NASPAR) + IXDIM(NDMPAR),
IYDIM(NDMPAR),NANG,ISKIT(128,3)
COMMON /ITALIC/ ANGIT
ANGIT=TAN(ANGIT/100.*.0174533)
X=X+ANGIT*Y            ! NEW XIN
RETURN
END
```

5.7 DIMPIX.FTN—THE CONVERSION OF CONTROLLED DIMENSIONS TO PIXEL

Different approaches have been tried for converting an established X or Y dimension, as defined in the input data, to the appropriate number of pixels to represent that dimension in the output data. Techniques seem to be device dependent and perhaps it makes sense at this point in the processing to differentiate The approach based on such output device characteristics as resolution, "crispness of dot", capability of the device to hold a single dot, etc. At this time, the following routine works well on the CANON laser beam printer, Model LBP-CX and should produce good results on a raster display screen.

Since vertical and horizontal character dimensions can only be represented by discreet pixels, the technique essentially is to divide the defined dimension (either X or Y) by the pixel dimension (as calculated in INPNCS.FTN) and round to the nearest whole pixel. The result is that the dimensions stored in IXDIM(NDMPAR) and IYDIM(NDMPAR) are replaced with the number of pixels calculated to best represent them. There are presently additional considerations as noted below.

```
Input:                -
XPIX = X-pixel dimension
YPIX = Y-pixel dimension
(Note: X and Y pixel dimensions need not be identical.)
SUBROUTINE DIMPIX (XPIX,YPIX)
PARAMETER NDMPAR=32    ! NUMBER OF
                         DIMENSIONS
PARAMETER NASPAR=10    ! NUMBER OF
                         ASSOCIATED POINTS
COMMON /SKEL/ NLOOP,LPEND
(20),NCLAS,ICLS(10,2),NUMS,ISK(256),NASPAR), +
IXDIM(NDMPAR),IYDIM(NDMPAR),NANG,ISKIT(128,3)
COMMON /ITALI/ ANGIT,OFFIT,HAFPIX
IXDIM(NDMPAR)=1
IYDIM(NDMPAR)=1        ! DIMENSION LIMIT FOR
                         UNCONTROLLED DIMENSIONS
ISTART=1
```

```
-continued
IXSTAN=0               ! X-STANDARD
                         (CURRENTLY UNUSED)
IYSTAN=0               ! Y-STANDARD
                         (CURRENTLY UNUSED)
IXD=0                  !
                         (CURRENTLY UNUSED)
IYD=0                  !
                         (CURRENTLY UNUSED)
DO 100 J=ISTART,NDMPAR-1
IXDIM=IXDIM(J)-IXD
IDIF=XDIM/XPIX+SIGN(.5,XDIM)
IXDIM(J)=IDIF+IXSTAN
```

A controlled dimension can never be 0. This is necessary to help prevent the disappearance of stems, etc. at very small sizes.

```
IF (IXDIM(J).EQ.0) IXDIM(J)=1
YDIM=IYDIM(J)0-IYD
IDIF-YDIM/YPIX+SIGN(.5,XDIM)
IYDIMJ-IDIF+IYSTAN
NOTE: (½-1¼ PIXEL "SHUT OFF") If a Y-dimension is
calculated to be one pixel, it is assumed that the representation
was arrived at because the dimension was anywhere between ½
and 1½ pixels. Because a particular dimension generally results
in a one pixel representation only at very low point sizes and
resolutions, where the variation of ½ pixel over a one pixel
dimension can be more easily discerned, it is necessary to allow
such dimensions to remain unrounded. Any degradation of the
character contour due to non-alignment is hidden or reduced by
the lack of sufficient resolution.
IF (IYDIMJ.NE.1) IYDIM(J)=IDYIMJ
IF (IYDIMJ.EQ.1) IYDIM(J)=-IYDIM(J)
```

If, after the above, any dimension remains at 0, it is "hardwired" to one pixel.

```
         IF (IYDIM(J).EQ.0) IYDIM(J)=1
100      CONTINUE
         RETURN
         END
```

5.8 GRYAJ.FTN/GRXAJ.FTN—GRID ALIGNMENT OF Y/X-SKELETAL POINTS

Processing of Y and X SKELETAL points is identical. Therefore, the routine presented here works for either, though references are made only to Y.

The tree-like structure of the SKELETAL data, ensures that each skeletal point eventually is passed to this routine. Here it is determined whether or not the point is to be aligned to the grid. The effect of grid alignment (or non-grid alignment) is offset in order to align with the grid. At the outset, a point is offset in order to align with the grid. That offset is carried over to any associated skeletal points. Those associated points are then grid aligned and their individual offsets are, likewise, carried over to their respective associated skeletal points, etc.

```
Input:
ICSKEL =   current index into ISK array (skeletal pts)
IC =       index into input contour and output contour arrays
           (contour coords)
Y or X =   Y- or X- value before grid alignment
Output:
Y or X =   new Y- or X-value after grid alignment
DY or DX = offset (Y upon entry minus Y upon exit).
SUBROUTINE GRYAJ (ICSKEL,IC,Y,DY)
COMMON /PARAM/ XPIX,YPIX     ! PIX DIMENSIONS
                               FOR BLACK
```

```
YY=Y    ! SAVE OLD Y
CALL FCHOXY (IC,XOUR,YOUR)    ! FETCH PREVIOUS
                                OFFSET
```

Some provision must be established to indicate when a point is not to be grid aligned (ALIGNMENT ATTRIBUTE FLAG). This is necessary to ensure consistency of italic angles, diagonals, and for the "½ to 1½ PIXEL SHUT-OFF" as described in DIMPIX.FTN. Presently, the sign of the skeletal point index into the contour array (XIN,YIN) is used to indicate ALIGNMEMT when index (IC) is greater than 0, and NON-ALIGNMENT when the index (IC) is less than 0. (Caution: Care must be taken to use only the absolute-value of IC when used as an index).

```
            IF (IC.LT.0 GO TO 100
```

Before a point is processed, a check is made to see if a previous ASSOCIAT-OR skeletal point has provided for an offset (YOUR) to the current point (index=abs val (IC)).

```
95   Y=YY+YOUR    ! INCLUDE PAST ADJUSTMENTS
```

After accommodating any offset made by a previous ASSOCIAT-OR skeletal point, the current point is grid aligned (if appropriate) by rounding the y-value to the nearest pixel boundary. This is accomplished by adding the previously stored offset (YOUR) to the y-value (Y), dividing by the y-pixel dimension (YPIX), adding 0.5, and truncating. The resulting number of pixels (IY) is multiplied by the pixel dimension (YPIX) to produce the grid aligned values. The new grid-aligned value (Y) as well as the actual offset required to produce grid-alignment (DY) is returned from the routine.

```
IY=Y/YPI)+.5    ! ADJUST TO NEAREST PIXEL
```

```
Y=IY*YPIX
DY=Y-YY         ! NOW PASS BACK AMOUNT OF
                  ADJUSTMENT
        RETURN
100  CONTINUE
```

At least one of the two skeletal points which are linked by direct association must be grid-aligned. Otherwise, unpredictable results occur. Therefore, a check must be made (ASYSREC.FTN) on all associated points of the current skeletal point if flagged for non-alignment, to find any similarly non-aligned condition. If one or more is found, the present non-alignment flag is overridden, the point is aligned, and the associated point is left (for now) to be flagged "non-align". the intent is that, in a given "branch" of the tree, if a series of non-aligned associated points are found, only the end of the "branch" will actually be non-aligned.

```
CALL ASYSRC (ICSKEL,ISTAT)   ! SEARCH BRANCH
                               FOR OTHER
                               NON-ALIG
IF (ISTAT.EQ.1) GO TO 95     ! ISTAT = 1 = ALIGN
                               CURRENT POINT
Y=Y+YOUR                     ! NO ALIGN -
                               PRESERVE FOR
                               ASSOC PT
DY=YOUR
RETURN
END
```

5.9 ASXSRC.FTN/ASYSRC.FTN

When a skeletal point (Index=ICSKEL) has been flagged for non-alignment, a check is performed to see that none of its associated points are also flagged for non-grid alignment. This condition can exist in two ways: first, as a flagged reference to the associated point in the skeletal point list; or second, as a flagged value in the dimension table. Both cases are checked for in this routine and when found, a value of 1 is returned to ISTAT. If no such condition occurs, 0 is returned.

```
Input:
ICSKEL =   index into skeletal point array
Output:
ISTAT =    status on completion:
           1 = presence of non-aligned point in this branch
           0 = no non-aligned point at this level
SUBROUTINE ASXSRC (ICSKEL,ISTAT)
PARAMETER NDMPAR=32    ! NUMBER OF DIMENSIONS
PARAMETER NASPAR=10    ! NUMBER OF ASSOCIATED POINTS
COMMON /SKEL/NLOOP,LPEND(20),NCLAS,ICLS(10,2),NUMS,(ISK(256)
NASPAR),
+  IXDIM(NDMPAR),IVDIM(NDMPAR),NANG,ISKIT(128,3)
COMMON /ITALIC/ ANGIT,OFFIT,HAFPIX
ISTAT=0
IF (ISK(ICSKEL,2).EQ.0) RETURN   ! END OF THE LINE
DO 100 j=1,ISK(ICSKEL,2)
NDIM=(ISK(ICSKEL,j+3))/1000
INDEX=(ISK(ICSKEL,J+3))-NDIM*1000
IF (IXDIM(NDIM).EQ.-1) GO TO 300   ! FOUND ONE
DO 75 k=ICSKEL,NUMS  !LOOK AT SKEL POINTER
IF (IABS(ISK(K,1)).EQ.INDEX) GO TO 85
75   CONTINUE
85   IF (ISK(K,L).LT.0) GO TO 300  ! FOUND NEG SKEL POINTER
100  CONTINUE
     RETURN
300  ISTAT=1
     RETURN
     END
```

5.10 ASSOCY.FTN/ASSOCX.FTN—MAINTAIN CHAR. DIMENSIONS BY "ASSOCIATIONS"

A skeletal point may have from 0 to 7 associated skeletal points whose final coordinate positions are dependent on that skeletal point's coordinate position. If, in the grid alignment process, the skeletal point is offset to the right, then its associated skeletal points will be similarly offset to the right prior to their grid alignment. Additionally, if an associated point is linked to the skeletal point via a CONTROLLED DIMENSION, then its final coordinate position is dependent on both the skeletal point's coordinate position and the controlled dimension.

When a skeletal point (Index=ISK (ICS,1)) has associated points (ISK(ICS,LK+3)) the index of each is individually passed to this routine (ASSOCY.FTN) with the new coordinate position (Y) and the difference between the new and the original positions (DY).

```
Input:
ICS =   index into skeletal point array.
LK  =   pointer defining associated point
Y   =   new position of ASSOCIAT-OR skeletal point
DY  =   offset from old Y to new Y -= calculated in
        GRYAJ.FTN
SUBROUTINE ASSOCY (ICS,LK,Y,DY)
COMMON /PARAM/ XPIX,YPIX,XESP,YRESP
! PIX DIMENSIONS FOR BLACK
PARAMETER NDMPAR=32    ! NUMBER OF
                         DIMENSIONS
PARAMETER NASPAR=10    ! NUMBER OF
                         ASSOCIATED POINTS
COMMON
/SKEL/NLOOP,LPEND(20),NCLAS,ICLS(10,2),NUMS,
ISK(256,NASPAR), +
IXDIM(NDMPAR),IYDIM(NDMPAR),NANGISKIT(128,3)
COMMON /ITALIC/ ANGIT,GLANGT
IYDIM(NDMPAR=1      ! Y MIN LIMIT FOR
                      UNCONTROLLED DIMEN
YPIXVR=YPIX/100.*125 ! PIXEL VARIATION FOR
                      CONTROL SHUT O
```

The present procedure combines the index of the associated point and the controlled dimension index into one word (ISK(ICS,LK+3)). Therefore, it is first necessary to extract the two pieces of information.

```
NDIM=(ISK(ICS,LK+3))/1000
INDEX=(ISK(ICS,LK+3))-NDIM*1000   ! MASK OFF
                                    DIMENSION
CALL FCHIXY (INDEX,XI,YI          ! FETCH ASSOC
                                    PT COORD
```

A dimension index is not always specified, resulting in a null dimension. Consequently, the representation in output pixels is calculated directly from the input contour data, i.e., by grid alignment after an appropriate offset.

```
IF (NDIM.LE.0) GO TO 1000    ! NULL CONTROLLED-
                               DIMENSION
```

As represented in DIMPIX.FTN, some dimensions fall between ½ and 1½ pixels and can best be represented by a non-grid aligned contour. This condition is flagged in DIMPIX by negative controlled-dimensions which have not been rounded to the nearest pixel boundary. In this situation, the associated point (YNEW) is placed a specified distance (IABS(IYDIM(NDIM)) from the skeletal point. The remaining list of skeletal points is then searched (INDSRC.FTN) for a reference to this associated point. When found, its index is flagged "negative" to indicated non-grid alignment. This presents grid-alignment when the associated point is processed in GRYAJ.FTN.

```
IF (IYDIM(NDIM).LT.0)     ! NO GRID ALIGN
GO TO 3000
```

In most cases, processing falls through to this point, where the associated point (YNEW) is placed a specified number of pixels from the skeletal point as indicated by the specified controlled-dimension (IYDIM(NDIM). This specification of a discreet number of pixels ensures grid alignment of the associated point.

```
100    YNEW=Y+(IYDIM(NDIM)*YPIX*SIGN
       (1.,(Y1-(Y-DY))))
```

If, however, there exists sufficient resolution to show a variation of YPIXVR from the controlled-dimension (IYDIM(NDIM), then the associated point is simply offset and allowed to be moved to the closest gridline when processed in GRYAJ.FTN. This is referred to as the 1¼ PIXEL SHUT-OFF.

```
700    IF (ABS(YNEW-(YI+DY)).GE.YPIXVR)
       GO TO 1000
710    YO-YNEW-YI        ! COMPUTE ALIGNMENT
                           OFFSET
       CALL STORY        ! STORE RESULTING
       (INDEX,YO)         ALIGNMENT OFFSET
       RETURN
```

If no controlled-dimension is specified (null dimension) and the actual contour dimension is between ½ and 1 pixel, then its dimension is declared "controlled" at 1 pixel (IYDIM(NDMPAR). This helps prevent the disappearance of character parts at low point size/resolutions.

```
1000   CONTINUE
       IF (ABS(Y-DY-YI).LT.YPIX.AND.ABS(Y-
       DY-YI).GE.YPIX/2.) GO TO
1010   CALL STORY (INDEX,DY)   ! LET FALL TO
                                 CLOSEST GRID
       RETURN
200    NDIM=NDMPAR
       GO TO 100               ! MIN DIM CON-
                                 TROL = 1 PIXEL
3000   CALL INDSRC             ! SEARCH FOR INDEX
       (INDEX,ICS)
       YNEW=Y+IABS(IYDIM       ! CALC NEW
       (NDIM))*SIGN(1.,(YI-
       (Y-DY)))
                               LOC WITH NONALIGNMENT
       GO TO 710
       END
```

5.11 INDSRC.FTN—SEARCH FOR SPECIFIED SKELETAL REFERENCE

If it is determined in ASSOCY.FTN or ASSOCX.FTN that a specified SKELETAL point is not to be grid-aligned, its reference in the SKELETAL list (ISK(N,1)) must be flagged "non-align". that is, its reference must be set negative.

```
        SUBROUTINE INDSRC (INDEX,ICS)
        PARAMETER NDMPAR=32    ! NUMBER OF
                                 DIMENSIONS
        PARAMETER NASPAR=10    ! NUMBER OF
                                 ASSOCIATED POINTS
        COMMON /SKEL/
        NLOOP,LPEND(20),NCLAS,ICLS(10,2),NUMS,
        ISK(256,NASPAR),
      + IXDIM(NDMPAR),IYDIM(NDMPAR,
        NANGISKIT(128,3)
        COMMON /ITALIC/ ANGIT,GLANGT
        DO 100 J=ICS+1,NUMS
        IF (IABS(ISK(J,1)).EQ.IABS(INDEX))
        GO TO 200
100     CONTINUE
        WRITE (5,*) 'INDSRC – FAILED TO
        FIND MATCHING INDEX',INDEX
        RETURN
200     ISK(J,1)=IABS(ISK(j,1))* – 1
        RETURN
        END
```

5.12 YPROC.FTN/XPROC.FTN—PROCESS BETWEEN SKELETAL POINTS

At this point in processing, the input contour array (XIN,YIN) contains data which has been adjusted only for italic skew and Y-CLASS scaling. However, no skeletal point modifications have been made directly to it. All grid-alignment offsets have been stored in the output contour array (XOU,YOU), and will now be used to manipulate the original contour for final processing. Now that the correct position of each SKELETAL point has been determined, the contour segments between SKELETAL points must be offset and scaled appropriately to actually establish the grid-aligned contour. Each contour loop is processed separately based on the loop definitions in LPEND(20).

```
Input:
ISTS = Pointer to start of SKELETAL point array
IENS = Pointer to end of SKELETAL point array
SUBROUTINE YPROC (ISTS,IENS)
INTEGER ISBUF(256)
COMMON /PARAM/ XPIX,YPIX,XRESP,YRESP ! FIX
DIMENSIONS FOR BD
PARAMETER NDMPAR=32    ! NUMBER OF
                         DIMENSIONS
PARAMETER NASPAR=10    ! NUMBER OF
                         ASSOCIATED POINTS
COMMON /SKEL/
NLOOP,LPEND(20),NCLAS,ICLS(10,2),NUMS,
ISK(256,NASPAR), +
IXDIM(NDMPAR),IYDIM(NDMPAR),NANG,
ISKIT(128,3)
COMMON /ITALIC/ ANGIT,OFFIT,HAFPIX
ISTV=1                 ! END POSITIONS OF
                         FIRST LOOP
IENV-LPEND(1)
DO 2000 LC–1,NLOOP     ! PROCESS EACH LOOP
```

A search of all skeletal points is made to locate those in this loop. When found, they are stored in the ISBUF array, where they are sorted in order around the character contour. The sorted points are moved from the input contour array (IXIN,YIN) to the output contour array (XOU,YOU).

```
IK=0 ! COUNTER FOR SKELETAL POINTS THIS LOOP
DO 500 JM–ISTS,IENS ! SEARCH FOR Y–SKEL POINTS
THIS LOOP
IF ((ISK(JM,3).NE.2).OR.(ISK(JM,1).GT.IENV)
.OR.(ISK(JM,1).LT.ISTV)
```

```
*       GO TO 550              ! LOAD BUFFER WITH Y
                                 SKEL PTS
        IK–IK+1                ! FOUND ONE
        ISBUF(IK)=ISK(1JM,1)
500     CONTINUE
        IF (IK.EQ.0) GO TO 1000  ! NONE THIS LOOP
        IF (IK.EQ.1) GO TO 3000  ! ERROR - CAN'T HAVE
                                 ONLY ONE
        DO 560 JM=1,IK         ! SORT BUFFER
        ISW=0
        DO 555 JN=2,IK
        IF (ISBUF(JN–1).LE.ISBUF(JN)) GO TO 555
        ISTMP=ISBUF(JN)        ! SWAP
        ISBUF(JN)=ISBUF(JN–1)
        ISBUF(JN–1)=ISTMP
        ISW=1
555     CONTINUE
        IF (ISW.EQ.0) GO TO 600
560     CONTINUE
600     DO 900 JJ=1,IK         ! INCORPORATE OUT-
                                 PUT WITH INPUT
        CALL FCHIXY (ISBUF)JJ0,XI,YI)
        CALL FCHOXY (ISBUF(JJ),XO,YO)
        YO=YI+YO
        CALL STORY (ISBUF(JJ),YO)
900     CONTINUE
        IK–IK+1
        ISBUF(IK)=ISBUF(1)     ! CLOSE THE SKELE-
                                 TAL LOOP
```

After collecting all applicable SKELETAL points for this loop, pairs of points in the ISBUF array are fed to YADJ.FTN. Each pair defines a segment along the contour to be offset and scaled.

```
1700    DO 800 JM=2,IK         ! PROCESS
800     CALL YADJ (ISBUF(JM–1),ISBUF(JM),
        ISTV,IENV)
        GO TO 1999
```

If a loop has no skeletal point (VERY UNLIKELY!!), it must be moved from the input array (XIN,YIN) to the output array (XOU,YOU).

```
1000    DO 1010 J=ISTV,IENV    ! MOVE THIS LOOP AS IS
        CALL FCHIXY (J,XI,YI)
        CALL STORY (J,YI)
1010    CONTINUE
1999    ISTV–IENV+1            ! END POSITIONS FOR
                                 NEXT LOOP
        IENV–LPEND(LC+1)
2000    CONTINUE
        RETURN
3000    WRITE (5,*) 'ERROR - ONLY ONE ANCHOR
        IN THIS LOOP',ISTV,IENV
        RETURN
        END
```

5.13 YADJ.FTN/XADJ.FTN—SCALE A SEGMENT

This routine processes a single segment, defined by two end points (IBEG,IEND), along a single character contour loop, defined by the start and end of the loop (ISTAV/IENDV). This process involves: (1) the calculation of the segment scale factor, based on the original segment end points (XIN1,YIN1 AND XIN2,YIN2) and the new end points after grid-alignment (XOU1,YOU1 and XOU2,YOU2), and (2) the calculation of the offset to bring the start of the original segment (XIN1,YIN1), to match the new segment start (XOU1,YOU1).

```
SUBROUTINE YADJ (IBEG,IEND,ISTAV,IENDV)
CALL FCHIXY (IBEG,XIN1,YIN1)
CALL FCHIXY (IEND,XIN2,YIN2)
CALL FCHOXY (IBEG,XOU1,YOU1)
CALL FCHOXY (IEND,XOU2,YOU2)
YDIF=YIN2-YIN1
IF (YDIF.EQ.0.) RETURN        ! NO NEED TO PROCESS
YFAK=(YOU2-YOU1)/YDIF         ! COMPUTE SCALE FAC-
                                TOR THIS SEGMENT
YSHF=YOU1-YIN1                ! COMPUTE OFFSET FOR
                                THIS SEGMENT
LEND-IEND-1
F (IEND.LE.IBEG) LEND-        ! THIS SEGMENT FALLS
IENDV                           OVER LOOP END
DO 100 J=IBEG+1,LEND          ! PROCESS SEGMENT
                                BETWEEN SKELETAL
                                POINTS
CALL FCHIXY (J,XP,YP)         ! SKELETAL POINTS
                                WERE ADDRESSED IN
                                YPROC.FTN
YP=(((YP-YIN1)*YFAK)+         ! SCALE AND OFFSET
YASHF)+YSPF)+YIN1
CALL STORY (J,YP)
100 CONTINUE
    IF (IEND.GE.IBEG) RETURN
```

Because segments can straddle the ends of a closed loop, a provision is made for processing the segment to the LOOP end, and then additionally processing from the LOOP start to the SEGMENT end.

```
    DO 200 J=ISTAV,           ! PROCESS SEGMENT
    IEND-1                      BEYOND LOOP END
    CALL FCHIXY (J,XP,YP)
    YP=(((YP=YIN1)+
    YFAK)+YSHF)+YIN1
    CALL STORY (J,YP)
200 CONTINUE
    RETURN
    END
```

5.14 ITALIC.FTN—ITALICIZATION AFTER Y-PROCESS

The intent is to "undo" the effect of UNITAL.FTN at a point where no more Y-processing will take place. By "skewing" the character, the italic angle is reintroduced with the X-value assuming a new position based on the new location of the Y-value. The new effect is as if all Y-adjustments were carried out along the italic angle thereby producing not only new Y-values, but also new X-values.

Two points should be noted. Because there are two contour arrays (XIN,YIN and XOU,YOU), and because Y-adjustments have been transferred to the XOU,YOU array while the X-adjustments have not taken place, the "skewing" algorithm is a combination of both arrays. Also note that the skew angle is not the character italic angle (ANGIT) as used in UNITAL.FTN, but is the typeface italic angle (GLANGT).

```
    SUBROUTINE ITALIC
    PARAMETER NDMPAR=32       ! NUMBER OF
                                DIMENSIONS
    PARAMETER NASPAR=10       ! NUMBER OF
                                ASSOCIATED POINTS
    COMMON /SKEL/
    NLOOP,LPEND(20),NCLAS,ICLS(10,2),NUMS,
    ISK(256,NASPAR),
+   IXDIM(NDMPAR),IYDIM(NDMPAR),
    NANG,ISKIT(128,3)
    COMMON /ITALIC/ ANGIT,GLANGT
    COMMON /CHROU/            ! OUTPUT FOR BLACK
    NUMO,XOU(256),
    YOU(256)
    COMMON /CHRIN/            ! INPUT FOR BLACK
    NUMI,XIN(256),
    YIN(256)
    DO 100 J=1,NUMI           ! RE ITALICIZE
100 XIN(J)=XIN(J)-GLANGT*
    YOU(J)
    RETURN
    END
```

5.15 NCSBLO.FTN—FINAL PROCESSING

The following steps are used for final processing.

```
Input:
    LUN   = logical unit
    ICHAR = character number
    ILSB  = original left sidebearing
    IRSB  = original right sidebearing
    IOFF  = reserved
    IDDD  = reserved
    IUNIT = unit value
    NREC  = width of original character
    IMIN  = reserved
    IMAX  = reserved
    HAFPIX = X-value to be added to all x-coordinates to bring
             X-SKELETAL points to fit between grid lines.

SUBROUTINE NCSBLO
(LUN,ICHAR,ILSB,IRSB,IOFF,IDDD,IUNIT,NREC,
IMIN,IMAX,HAFPIX
COMMON /CHROU/ NUMO,        ! OUTPUT FOR BLACK
XOU(256),YOU(256)
COMMON /PARAM/ XPIX,        ! PIX DIMENSIONS FOR
YPIX,XRESP,YRESP              BLACK
PARAMETER NDMPAR=32         ! NUMBER OF
                              DIMENSIONS
PARAMETER NASPAR=10         ! NUMBER OF
                              ASSOCIATED POINTS
COMMON /SKEL/
NLOOP,LPEND(20,NCLAS,ICLS(10,2),
NUMS,ISK(256),NASSPAR), +
IXDIM(NDMPAR),IYDIM(NDMPAR),
NANG,ISKIT(128,3)
COMMON /ITALIC/ ANGIT,GLANGT
```

Because the character width is changed by grid alignment, new sidebearings must be calculated to allow the entire character width (LLSB+WIDTH+RSB) to equal the character unit value. To this end, the new minimum and maximum X-values are located to determine the new character width. New sidebearings can then be established.

```
    XMINT=-XOU(1)
    XMAXT-XOU(1)
    DO 2500 J=1,LPEND(NLOOP)   ! FIND MIN/MAX
    IF (XOU(J).LT.XMINT)
    XMINT-XOU(J)
    IF (XOU(J).GT.XMAXT)
    XMAXT-XOU(J)
2500, CONTINUE
    IXMAX=XMAXT                ! ADJUST WIDTH,
                                 LSB,RSB
    IXMIN=IXMAX-IXMIN+1
    NDIF-NWIDTH-NREC
    IXMAX=ILSB+NREC+IRSB
    ILSB=ILSB-NDIF/2           ! NEW LSB
    IRSB=IXMAX-NWIDTH-         ! NEW RSB
    NREC=NWIDTH                ! NEW WIDTH
```

The final step is to offset the X-values by the amount required to bring the grid-aligned skeletal points to sit exactly between grid lines (HAFPIX).

```
           DO 1000 J=1,LPEND(NLOOP)
   1000    XOU(J)=XOU(J)+HAFPIX
           RETURN
           END
```

5.16 SAMPLE DATA

The following is a listing of the files required for processing CG-TIMES, T/F 2500, CHARACTER 0003.

5.17 00003.LOP—CLOSED-LOOP 8400 VECTOR CONTOUR

| Record 1: | Header | |
|---|---|---|
| | field 1 = | character number |
| | field 2 = | LSB |
| | field 3 = | RSB |
| | field 4 = | baseline |
| | field 5 = | reserved |
| | field 6 = | unit value |
| | field 7 = | width |
| | field 8 = | Y-min |
| | field 9 = | Y-max |
| | field 10 = | number of vector end points=N |
| Record 2: | Coordinates | |
| | field 1 = | point number |
| | field 2 = | X coordinate |
| | field 3 = | Y coordinate |
| | field 4 = | IPEN (if IPEN equals zero, it indicates the start of a new loop. If IPEN is not zero, it defines the Y-CLASS to which this coordinate is assigned). |

| 3 | 11 | 8 | 1536 | 0 | 27 | 557 | 576 | 1538 | 72 |
|---|---|---|---|---|---|---|---|---|---|
| 1 | 1 | 1511 | 0 | | | | | | |
| 2 | 6 | 1512 | 1 | | | | | | |
| 3 | 37 | 1505 | 1 | | | | | | |
| 4 | 54 | 1493 | 1 | | | | | | |
| 5 | 65 | 1474 | 1 | | | | | | |
| 6 | 72 | 1448 | 1 | | | | | | |
| 7 | 75 | 1419 | 1 | | | | | | |
| 8 | 76 | 1400 | 1 | | | | | | |
| 9 | 76 | 737 | 2 | | | | | | |
| 10 | 74 | 711 | 2 | | | | | | |
| 11 | 68 | 688 | 2 | | | | | | |
| 12 | 58 | 675 | 2 | | | | | | |
| 13 | 41 | 667 | 2 | | | | | | |
| 14 | 6 | 667 | 2 | | | | | | |
| 15 | 6 | 639 | 2 | | | | | | |
| 16 | 173 | 576 | 2 | | | | | | |
| 17 | 176 | 577 | 2 | | | | | | |
| 18 | 176 | 988 | 1 | | | | | | |
| 19 | 185 | 981 | 1 | | | | | | |
| 20 | 228 | 937 | 1 | | | | | | |
| 21 | 164 | 911 | 1 | | | | | | |
| 22 | 304 | 896 | 1 | | | | | | |
| 23 | 345 | 892 | 1 | | | | | | |
| 24 | 379 | 896 | 1 | | | | | | |
| 25 | 413 | 911 | 1 | | | | | | |
| 26 | 438 | 932 | 1 | | | | | | |
| 27 | 452 | 950 | 1 | | | | | | |
| 28 | 470 | 987 | 1 | | | | | | |
| 29 | 478 | 1014 | 1 | | | | | | |
| 30 | 483 | 1044 | 1 | | | | | | |
| 31 | 485 | 1076 | 1 | | | | | | |
| 32 | 486 | 1119 | 1 | | | | | | |
| 33 | 487 | 1402 | 1 | | | | | | |
| 34 | 488 | 1432 | 1 | | | | | | |
| 35 | 493 | 1461 | 1 | | | | | | |
| 36 | 501 | 1481 | 1 | | | | | | |
| 37 | 512 | 1498 | 1 | | | | | | |
| 38 | 534 | 1508 | 1 | | | | | | |
| 39 | 557 | 1513 | 1 | | | | | | |
| 40 | 557 | 1537 | 1 | | | | | | |
| 41 | 556 | 1538 | 1 | | | | | | |
| 42 | 307 | 1538 | 1 | | | | | | |
| 43 | 307 | 1512 | 1 | | | | | | |
| 44 | 340 | 1507 | 1 | | | | | | |
| 45 | 361 | 1493 | 1 | | | | | | |
| 46 | 373 | 1473 | 1 | | | | | | |
| 47 | 380 | 1442 | 1 | | | | | | |
| 48 | 383 | 1404 | 1 | | | | | | |
| 49 | 384 | 1364 | 1 | | | | | | |
| 50 | 384 | 1162 | 1 | | | | | | |
| 51 | 383 | 1106 | 1 | | | | | | |
| 52 | 382 | 1080 | 1 | | | | | | |
| 53 | 378 | 1045 | 1 | | | | | | |
| 54 | 370 | 1020 | 1 | | | | | | |
| 55 | 358 | 1001 | 1 | | | | | | |
| 56 | 336 | 984 | 1 | | | | | | |
| 57 | 307 | 976 | 1 | | | | | | |
| 58 | 303 | 976 | 1 | | | | | | |
| 59 | 273 | 979 | 1 | | | | | | |
| 60 | 237 | 995 | 1 | | | | | | |
| 61 | 214 | 1015 | 1 | | | | | | |
| 62 | 176 | 1056 | 1 | | | | | | |
| 63 | 176 | 1384 | 1 | | | | | | |
| 64 | 178 | 1424 | 1 | | | | | | |
| 65 | 183 | 1462 | 1 | | | | | | |
| 66 | 191 | 1482 | 1 | | | | | | |
| 67 | 206 | 1498 | 1 | | | | | | |
| 68 | 224 | 1508 | 1 | | | | | | |
| 69 | 249 | 1512 | 1 | | | | | | |
| 70 | 249 | 1538 | 1 | | | | | | |
| 71 | 1 | 1538 | 1 | | | | | | |
| 72 | 1 | 1511 | 1 | | | | | | |

5.18 0005.SKL—SKELETAL DATA

| Records 1-4: | Nine fields each – containing X-dimensions |
|---|---|
| field 1 = | number of dimensions this record |
| fld 2-9 = | dimensions |
| Records 5-8: | Same for Y-dimensions |
| Record 9: | Closed loop definition |
| field 1 = | number of loops |
| field 2 = | number of last coordinate in a loop |
| field 3 = | same, if present |
| Record 10: | Y-CLASS definition |
| field 1 = | number of Y-classes |
| field 2 = | bottom of Y-class |
| field 3 = | top of Y-class |
| fld 4,5 = | same as 2,3, if present |
| Record 11: | Italic angle |
| field 1 = | angle *100 |
| field 2 = | reserved |
| Record 12-N+12: | Skeletal point data where N=number of skeletal points |
| field 1 = | skeletal point index to 00003.LOP file |
| field 2 = | number of associated points |
| field 3 = | X-skeletal or Y-skeletal point definition |
| fld 4-10 = | associated point/index to dimension list |

| 8 | 104 | | 137 | | 101 | | 122 | |
|---|---|---|---|---|---|---|---|---|
| 8 | 79 | | 103 | | 57 | 363 | 309 | 33 |
| 0 | 0 | | | | | | | |
| 0 | 0 | | | | | | | |
| 8 | 45 | | 62 | | 50 | | 66 | |
| 8 | 26 | | 37 | | 87 | 68 | 72 | |
| 0 | 0 | | | | | | | |
| 0 | 0 | | | | | | | |
| 1 | 72 | | | | | | | |
| 2 | 1536 | 908 | 908 | 576 | | | | |
| 0 | 0 | | | | | | | |
| 8 | 3 | 1 | 9072 | 9014 | 5062 | | | |
| 72 | 0 | 1 | 0 | | | | | |
| 14 | 0 | 1 | 0 | | | | | |
| 62 | 3 | 1 | 9069 | 15032 | 17 | | | |
| 69 | 0 | 1 | 0 | | | | | |
| 17 | 0 | 1 | 0 | | | | | |
| 32 | 2 | 1 | 5049 | 9039 | | | | |
| 39 | 0 | 1 | 0 | | | | | |
| 49 | 1 | 1 | 9043 | | | | | |
| 43 | 0 | 1 | 0 | | | | | |

-continued

| | | | | |
|---|---|---|---|---|
| 17 | 1 | 2 | 15015 | |
| 15 | 1 | 2 | 9014 | |
| 14 | 0 | 2 | 14 | |
| 23 | 1 | 2 | 57 | |
| 57 | 0 | 2 | 0 | |
| 18 | 1 | 2 | 62 | |
| 62 | 0 | 2 | 0 | |
| 40 | 2 | 2 | 9043 | 9039 |
| 43 | 0 | 2 | 0 | |
| 39 | 0 | 2 | 0 | |
| 70 | 2 | 2 | 9072 | 9069 |
| 72 | 0 | 2 | 0 | |
| 69 | 0 | 2 | 0 | |
| 0 | 0 | 0 | 0 | |

Use of the FORTRAN routines set forth above on the input data will produce a grid aligned scaled character that can be filled.

It will be appreciated from the preceding description of a specific application of the method of invention that the method can be used in a variety of applications to produce scaleable typeface or character data that is capable of providing bit-map font data at any resolution and at any point size. Additionally the method can be used to produce grid-aligned contours for output to contour driven devices, such as, pen plotters millers and numerically controlled machines.

The method of the invention works with a database containing data that is representative of the coordinates of the character contour defining points. The coordinates can be expressed in polar or Cartesian notation and can be stored uncompressed in the database or in compressed form using any of the widely known data compression techniques. Therefore, as used herein, the expression "data representative of the coordinates" includes coordinate data in both notations and in either compressed or uncompressed form.

What I claim and desired to secure by Letters Patent of the United States:

1. A method for producing a scaleable character database from an input database containing data representative of the coordinates of a plurality of points located on a continuous, closed loop contour of a character, said method comprising the steps of:
    (1) dividing the continuous, closed loop contour of the character into a plurality of sequentially abutting and ordered scaling segments with each scaling segment being located between a pair of points on the character contour, said pair of character contour points constituting a first skeletal point and a second skeletal point;
    (2) offsetting all coordinates in each scaling segment to bring the corresponding first skeletal point into alignment with an output grid; and,
    (3) linearly scaling each scaling segment with a scale factor that brings the corresponding second skeletal point into alignment with the output grid.

2. The scaleable character database produced by the method of claim 1.

3. The method of claim 1 further comprising the steps of:
    (1) establishing one or more associated skeletal points with respect to at least one selected skeletal point;
    (2) establishing one or more other associated skeletal points with respect to at least one selected associated skeletal point;
    (3) shifting at least some of said associated and other associated skeletal points into alignment with the output grid.

4. The scaleable character database produced by the method of claim 3.

5. The method of claim 1 further comprising the steps of:
    (1) establishing one or more associated skeletal points with respect to at least one selected skeletal point;
    (2) establishing one or more other associated skeletal points with respect to at least one selected associated skeletal point;
    (3) shifting at least some of said associated and other associated skeletal points to bring the points into specific non-aligned positions with respect to the output grid.

6. The scaleable character database produced by the method of claim 5.

7. The method of claim 1 further comprising the steps of:
    (1) establishing one or more associated skeletal points with respect to at least one selected skeletal point;
    (2) establishing one or more other associated skeletal point with respect to at least one selected associated skeletal point;
    (3) shifting at least some of said associated and other associated skeletal points predetermined distances in order to control their positions in relation to the corresponding at least one selected skeletal point.

8. The scaleable character database produced by the method of claim 7.

9. The method of claim 7 wherein said associated and other associated skeletal points are shifted by said predetermined distances in a predetermined sequence in order to control specific character dimensions.

10. The method of claim 9 wherein said predetermined sequence of associated and other associated skeletal points shifting is tree-like.

11. The method of claim 1 further comprising the steps of:
    (1) establishing:
        (a) one or more associated skeletal points with respect to at least two selected skeletal points,
        (b) one or more other associated skeletal points with respect to said selected associated skeletal points,
        to form at least two tree-like skeletal point data structures;
    (2) shifting at least some of said associated and other associated skeletal points to bring the points into specific non-aligned positions with respect to the output grid;
    (3) shifting at least some of said associated and other associated skeletal points into alignment with the output grid; and,
    (4) establishing an additional point that is associated with one of said tree-like data structures whenever the two tree-like data structures converge on the same character point so that a conflict between the two tree-like data structures is avoided.

12. The method of claim 1 further comprising the steps of:
    (1) establishing one or more associated skeletal points with respect to at least one selected skeletal point;
    (2) establishing one or more other associated skeletal point with respect to at least one selected associated skeletal point;

said steps being performed whenever the resolution of the output grid is high enough to display accurately any variations in such distances which were designed into the character.

13. A method for producing a scaleable character database from an input database containing data representative of the coordinates in X and Y of a plurality of points located on a continuous, closed loop contour of a character, said method comprising the steps of:
   (1) dividing the continuous, closed loop contour of the character into a plurality of sequentially abutting and ordered scaling segments with each scaling segment being located between a pair of points on the character contour, said pair of character contour points constituting a first skeletal point and a second skeletal point;
   (2) offsetting all coordinates in each scaling segment to bring the corresponding first skeletal point into alignment with an output grid; and,
   (3) linearly scaling each scaling segment with a scale factor that brings the corresponding second skeletal point into alignment with the output grid.

14. The method of claim 13 wherein the character contour segments are assigned to specific Y-axis zones and all segments within a given Y-axis zone are offset and scaled the same under steps (2) and (3).

15. The scaleable character database produced by the process of claim 14.

16. A method for producing a scaleable character database from an input database containing data representative of the coordinates of a plurality of points located on a continuous, closed loop contour of a character, said method comprising the steps of:
   (1) dividing the continuous, closed loop contour of the character into a plurality of sequentially abutting and ordered scaling segments with each scaling segment being located between a pair of points on the character contour, said pair of character contour points constituting a first skeletal point and a second skeletal point;
   (2) offsetting all coordinates in each scaling segment in order to bring the corresponding first skeletal point into alignment with the grid;
   (3) linearly scaling each scaling segment that is not a segment of a diagonal portion of the character with a scale factor that brings the corresponding second skeletal point into alignment with the grid; and,
   (4) linearly scaling each scaling segment of a diagonal portion of the character with a scale factor of 1 whereby the corresponding second skeletal point remains in its original relationship with respect to its corresponding first skeletal point.

17. The scaleable character database produced by the method of claim 16.

* * * * *